US012761179B2

(12) United States Patent
Wang et al.

(10) Patent No.: US 12,761,179 B2
(45) Date of Patent: Oct. 13, 2026

(54) SENSING ELECTRODE, ELECTROCHEMICAL SENSING SYSTEM COMPRISING THE SAME, AND METHODS THEREOF

(71) Applicant: 2WITECH SOLUTIONS LLC, Lowell, MA (US)

(72) Inventors: Qingwu Wang, Chelmsford, MA (US); Yufeng Ma, Boston, MA (US)

(73) Assignee: 2WITECH SOLUTIONS LLC, Andover, MA (US)

( * ) Notice: Subject to any disclaimer, the term of this patent is extended or adjusted under 35 U.S.C. 154(b) by 230 days.

(21) Appl. No.: 18/357,129

(22) Filed: Jul. 23, 2023

(65) Prior Publication Data

US 2024/0035998 A1 Feb. 1, 2024

Related U.S. Application Data

(60) Provisional application No. 63/474,201, filed on Jul. 27, 2022.

(51) Int. Cl.
*G01N 27/30* (2006.01)

(52) U.S. Cl.
CPC .................................... *G01N 27/30* (2013.01)

(58) Field of Classification Search
CPC ....... G01N 27/30; G01N 27/48; G01N 27/308
See application file for complete search history.

(56) References Cited

U.S. PATENT DOCUMENTS

2016/0178649 A1 * 6/2016 Shashidhar ............ G01N 33/74
422/69

FOREIGN PATENT DOCUMENTS

WO WO-2018162611 A1 * 9/2018 ............ G01N 27/30

OTHER PUBLICATIONS

Kazemi et al., Quantifying interference effects on molecularly imprinted polymer sensors for per- and polyfluoroalkyl substances (PFAS), Analytical Chemistry, 2020, 92, 10597-10605 (Year: 2020).*
Elfadil et al., Molecularly Imprinted Polymers Combined with Electrochemical Sensors for Food Contaminants Analysis, Molecules, 2021, 26, 4607 (Year: 2021).*

(Continued)

*Primary Examiner* — Shizhi Qian

(74) *Attorney, Agent, or Firm* — George Guosheng Wang; Upstream Research and Patent LLC

(57) ABSTRACT

The present invention provides a sensing electrode, an electrochemical sensing system using the sensing electrode, methods of preparing and using the sensing electrode and the electrochemical sensing system. The sensing electrode includes a base electrode having a conductive surface, and a coating layer formed on the conductive surface. The coating layer has cavities or holes, each of which can be filled with, bound to, or occupied by, an analyte molecule. A decrease of conductivity of the sensing electrode is correlated to the number of cavities or holes that are filled with, bound to, or occupied by, the molecules of the analyte. The invention exhibits numerous technical merits such as suitability for field application, high sensitivity to analyte such as PFOA or PFAS at 1 ppt level, rapid response within minutes, and superior selectivity against interferences such as PFDA, PFOS, PFOSA, and PFHxA, among others.

6 Claims, 17 Drawing Sheets

01

(56) References Cited

OTHER PUBLICATIONS

Clark et al., Towards deployable electrochemical sensors for per- and polyfluoroalkyl substances (PFAS), Chem. Commun., 2021, 57, 8121 (Year: 2021).*
Karimian et al., Electrochemosensor for Trace Analysis of Perfluorooctanesulfonate in Water Based on a Molecularly Imprinted Poly (o-phenylenediamine) Polymer, ACS Sensors, 2018, 3, 1291-1298 (Year: 2018).*

* cited by examiner

SENSING ELECTRODE, ELECTROCHEMICAL SENSING SYSTEM COMPRISING THE SAME, AND METHODS THEREOF

CROSS-REFERENCE TO RELATED APPLICATIONS

The present application for patent claims the benefit of U.S. Provisional Patent Application No. 63/474,201 filed Jul. 27, 2022, the entire disclosures of which is incorporated herein by reference.

STATEMENT REGARDING FEDERALLY SPONSORED RESEARCH OR DEVELOPMENT

The invention was made with the US EPA Small Business Innovation Research (SBIR) support under Contract No. 68HERC20C0052. The government may have certain rights in the invention.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to a sensing electrode, an electrochemical sensing system comprising the sensing electrode, a method of preparing the sensing electrode and the electrochemical sensing system, and a method of using the sensing electrode and the electrochemical sensing system.

BACKGROUND OF THE INVENTION

Currently, there exists a need for sensors and sensing devices used for detecting or measuring analytes containing a non-metallic element. For example, compounds from a large family of perfluorinated chemicals (PFCs), such as perfluorooctane sulphonate (PFOS) and perfluorooctanoic acid (PFOA), have attracted worldwide attention in the scientific regulatory community and among the public due to their persistent, bio-accumulative, and toxic characteristics that can significantly deteriorate human health. PFOS and PFOA have found significant usage in many industrial and consumer applications that require high chemical stability and dirt-water-oil repellency, characteristics which are provided by the strong electro-negativity and small atomic size of fluorine molecules. They are also used for firefighting at airfields because of their inherent ability to create aqueous firefighting form foams (AFFFs) to extinguish fuel and hydrocarbon fires. Unfortunately, the chemical nature of fluorine makes the carbon-fluorine bond the strongest in nature, which makes these fluorinated compounds resistant to chemical or biochemical reactions and degradation processes. Due to increasing concerns over the long-term health effects of PFOS and per- and polyfluoroalkyl substances (PFAS) on the human body, regulatory agencies have set limits for the concentrations of PFOS and PFAS in drinking water. In 2016, the United States Environmental Protection Agency (USEPA) established a lifetime health advisory (LHA) level of 70 parts per trillion (ppt) for individual or combined concentrations of PFOA and PFOS in drinking water. Recent studies indicate that exposure to PFOA and PFOS over certain levels may result in adverse health effects, including developmental defects in fetuses and breast-fed infants, cancer, liver effects, immune effects, thyroid effects, and others. Hence, the development of trace detection and monitoring systems for PFOS and PFOA in water is highly necessary.

Currently, mass-spectrometry-based technologies are the main methods used to detect trace perfluorinated acids in various samples with sufficient sensitivity and selectivity. However, these methods require large and expensive equipment, have high operation costs, and sometimes suffer matrix interferences, making them unsuitable for routine analysis of PFOS and PFOA in the field.

Lab analysis for PFAS (EPA 537) is time-consuming and expensive, taking as long as 3 weeks and costing up to $450 per sample. Mobile labs can be rented for ~$500/week to cut down on analysis time. The detection of PFAS compounds in the field remains a big problem to solve. People currently send all samples back to a lab, which is time-consuming and expensive and creates bottlenecks for large projects.

Advantageously, the present invention provides a novel sensing electrode, an electrochemical sensing system comprising the sensing electrode, a method of preparing the sensing electrode and the electrochemical sensing system, and a method of using the sensing electrode and the electrochemical sensing system. For example, the electrochemical sensing system is fieldable, and it demonstrates a sensitivity to the analyte such as PFOA or PFAS at 1 ppt level, a rapid response within minutes, a wide dynamic range ranging to 1 ppb, and a selectivity against interferences such as PFDA, PFOS, PFOSA, and PFHxA.

SUMMARY OF THE INVENTION

One aspect of the present invention provides a sensing electrode comprising a base electrode having a conductive surface, and a coating layer formed on the conductive surface. The sensing electrode of the invention is configured for detecting an analyte. The coating layer has cavities or holes, each of which can be filled with, bound to, or occupied by, a molecule of the analyte. A decrease of conductivity of the sensing electrode is correlated to the number of cavities or holes that are filled with, bound to, or occupied by, the molecules of the analyte.

Another aspect of the invention provides an electrochemical sensing system comprising one or more sensing electrodes as described above.

Still another aspect of the invention provides a method of preparing the sensing electrode as described above. The first step is forming an initial layer embedded with molecules of the analyte on the conductive surface. The second step is removing the analyte molecules from the initial coating layer, leaving the cavities or holes behind.

A further aspect of the invention provides a method of determining the level of an analyte in a sample solution using the electrochemical sensing system as described above.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being “on”, “connected to”, or “coupled to” another element, it can be directly on, connected or coupled to the other element or intervening elements may be present. In contrast, when an element is referred to as being “directly on”, “directly connected to”, or “directly coupled to” another element, there are no intervening elements present.

Figure 1:
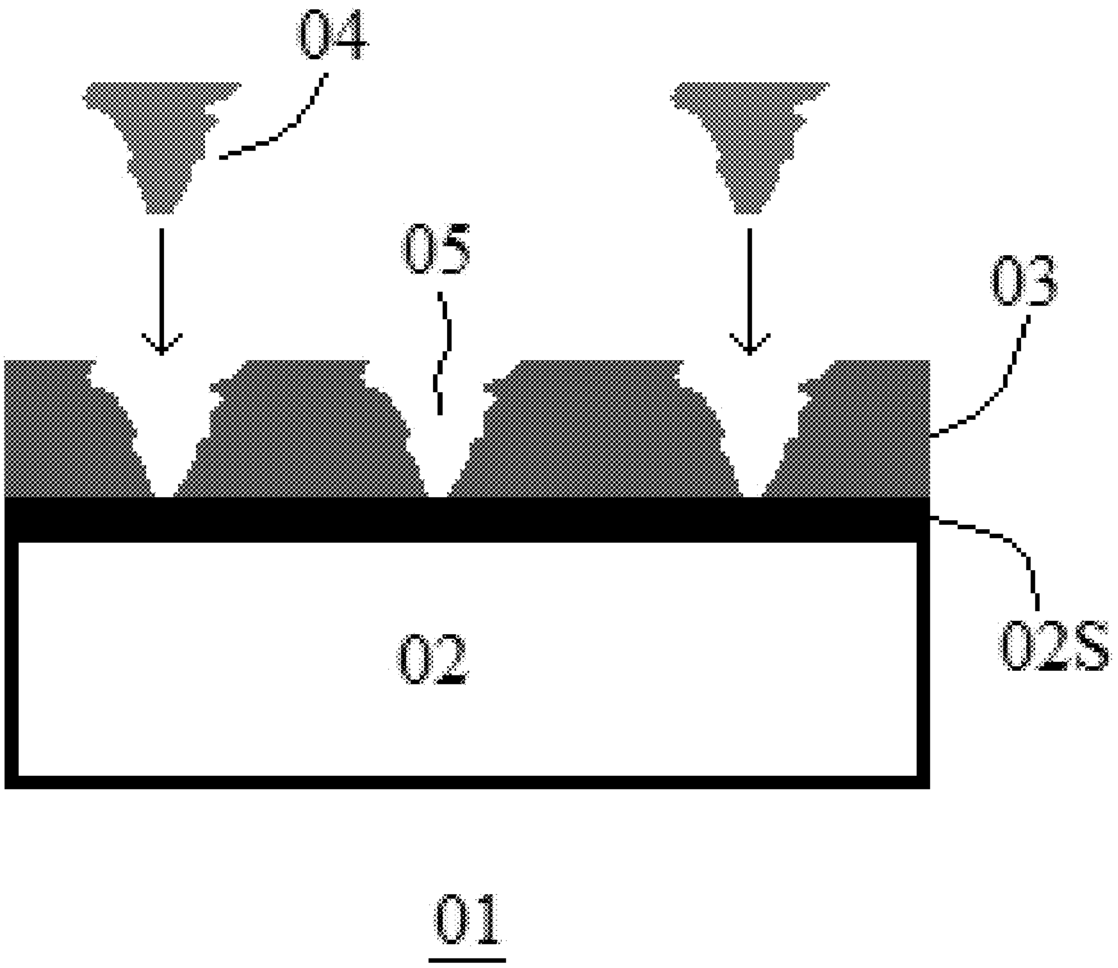
FIG. 1 schematically shows a sensing electrode that includes a base electrode having a conductive surface and a coating layer formed on the conductive surface, in accordance with exemplary embodiments of the present invention.

With reference to FIG. 1, various embodiments of the invention provide a sensing electrode 01 that includes a base electrode 02 having a conductive surface 02*s*, and a coating layer 03 formed on the conductive surface 02*s*. The sensing electrode 01 is configured for detecting an analyte 04. The coating layer 03 has cavities 05 or holes 05, each of which can be filled with, bound to, or occupied by, a molecule of the analyte 04. A decrease of electrical conductivity of the sensing electrode 01, as measured along the direction that is perpendicular to the conductive surface 02*s*, is correlated to the number (or amount) of cavities or holes 05 that are filled with, bound to, or occupied by, the molecules of the analyte 04.

The sensing electrode 01 may be used as paired interdigital electrodes, integrated circular electrodes, discrete electrodes, or any other suitable electrodes. In various embodiments, the base electrode 02 may be made of material selected from metals such as Au, Pt, and Ag; pristine or modified conductive metal oxides such as indium tin oxide (ITO), indium zinc oxide (IZO), and aluminum zinc oxide (AZO); conductive polymers such as Poly(3,4-ethylenedioxythiophene) (PEDOT); and various carbon materials such as glass carbon, carbon nanotubes, graphene, and reduced graphene oxide. In preferred embodiments, the base electrode 02 is a glassy carbon electrode (GCE) or a gold electrode.

In some embodiments, each of the cavities or holes 05 has a shape that is complementary to the shape of the analyte molecule 04. The analyte 04 may contain a non-metallic element selected from F, Cl, Br, I, O, S, Se, Te, N, P, As, Sb, B, C, H, or any combination thereof. In preferred embodiments, the coating layer 03 is made of a material that contains the same non-metallic element as the analyte 04 does. For example, the coating layer 03 can have functional groups such as —OH, $NH_2$, $CH_3$, $CF_3$, which are preferably affinitive to the analyte molecules 04.

In exemplary embodiments, the non-metallic element is F. The analyte 04 may be selected from fluorinated chemicals such as perfluorinated chemicals (PFCs), e.g. perfluoroalkyl substance. Examples of perfluoroalkyl substance include, but are not limited to, perfluorooctane sulphonate (PFOS) and perfluorooctanoic acid (PFOA); an herbicide such as atrazine, and PFAS (EPA 537).

Any suitable method may be employed to form the coating layer 03 on the conductive surface 02S. In preferred embodiments, the coating layer 03 is produced by electrochemical polymerization (such as cyclic voltammetry) of a mixture containing suitable monomers and the analyte 04, followed by removing the analyte 04 from the product of electrochemical polymerization. In some examples, the mixture may include phenol, 3-hydroxyphenlurea, and 2-(trifluoromethyl)acrylic acid, while the analyte 04 is PFOA. In other examples, the mixture may include 4-(trifluoromethyl) benzene-1,2-diamine, and 4-vinylaniline, while the analyte 04 is PFAS. In preferred embodiments, the product of the electrochemical polymerization in the invention comprises a random polymer rather than a block polymer.

Figure 2:
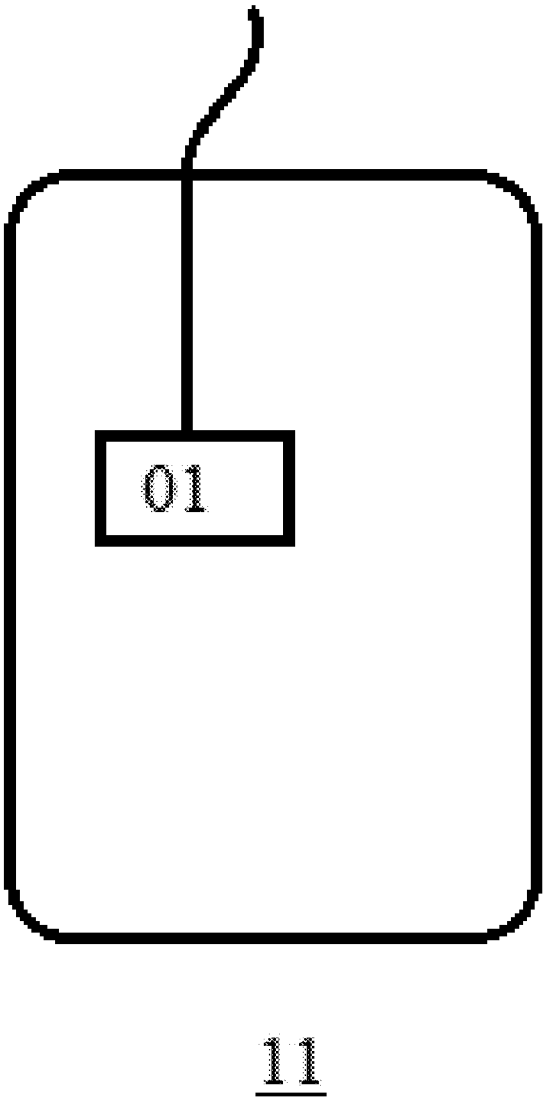
FIG. 2 schematically depicts a general electrochemical sensing system using one or more sensing electrodes as shown in FIG. 1, in accordance with exemplary embodiments of the present invention.
Figure 3:
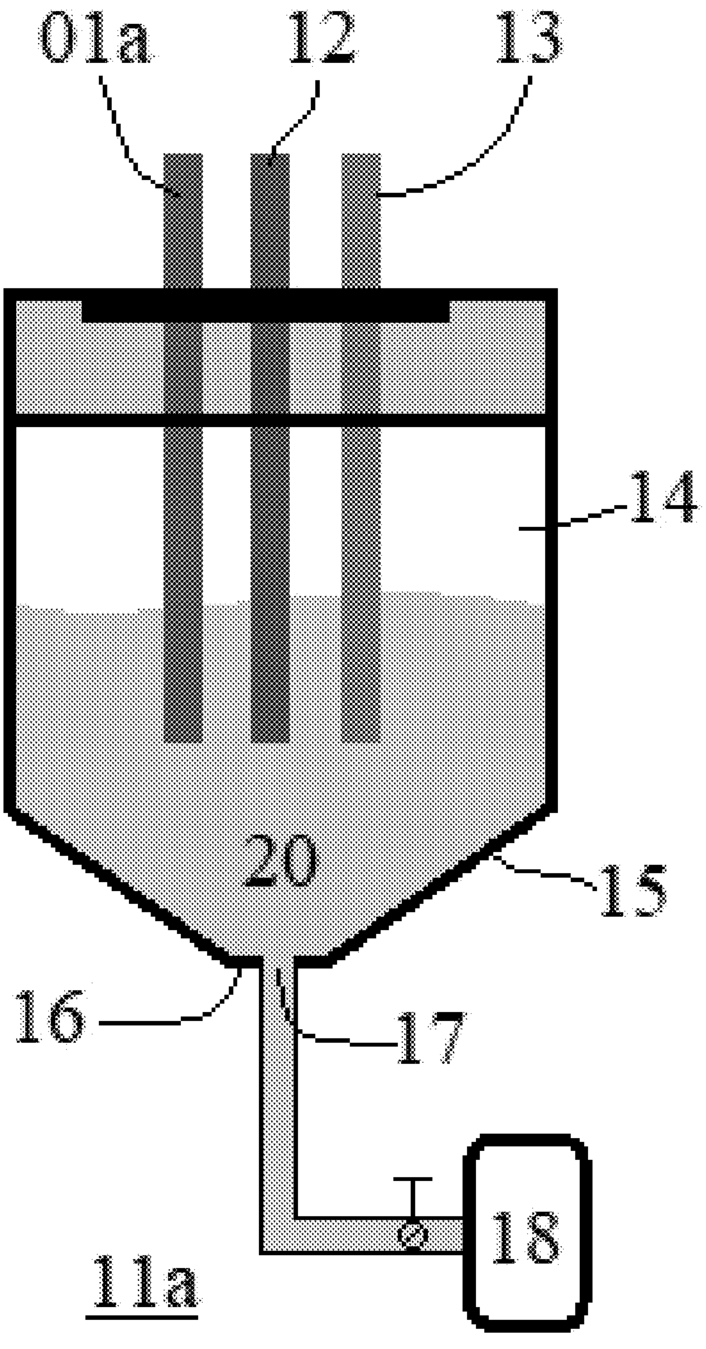
FIG. 3 schematically illustrates a conventional three-electrode DPV system, as a specific example of the general electrochemical sensing system of FIG. 2, in accordance with exemplary embodiments of the present invention.

With reference to FIG. 2, various embodiments of the invention provide an electrochemical sensing system 11 comprising one or more sensing electrodes 01. The electrochemical sensing system 11 may be configured for any suitable sensing mechanisms, for example, differential pulse voltammetry (DPV) or electrical impedance spectroscopy (EIS). Take DPV as an example. Such an electrochemical sensing system 11 may be configured as a conventional three-electrode DPV system 11*a* as shown in FIG. 3. The DPV system 11*a* may include (i) a sensing electrode Ola used as a working electrode, (ii) a reference electrode 12 such as an Ag/AgCl electrode, and (iii) a counter electrode 13 such as a glass carbon electrode or a platinum wire for current injection. In some embodiments, the counter electrode 13 may also be a sensing electrode 01. The DPV system 11*a* may include a mediator such as ferrocyne carboxyl acid (FCA).

As shown in FIG. 3, the electrochemical sensing system 11 a may include a container 14 with a bottom 15 that is tapered down to a terminal tip 16. The terminal tip 16 may have an opening 17 connected to a filling/draining device 18 such as a syringe that is configured for filling or refilling a liquid 20 into the container 14 and draining a liquid 20 out of the container 14.

Advantageously, the electrochemical sensing system 11*a* can demonstrate a sensitivity to the analyte such as PFOA or PFAS at 1 ppt level, a rapid response within minutes, a wide dynamic range ranging to 1 ppb, and a selectivity against interferences such as PFDA, PFOS, PFOSA, and PFHxA.

Figure 4:
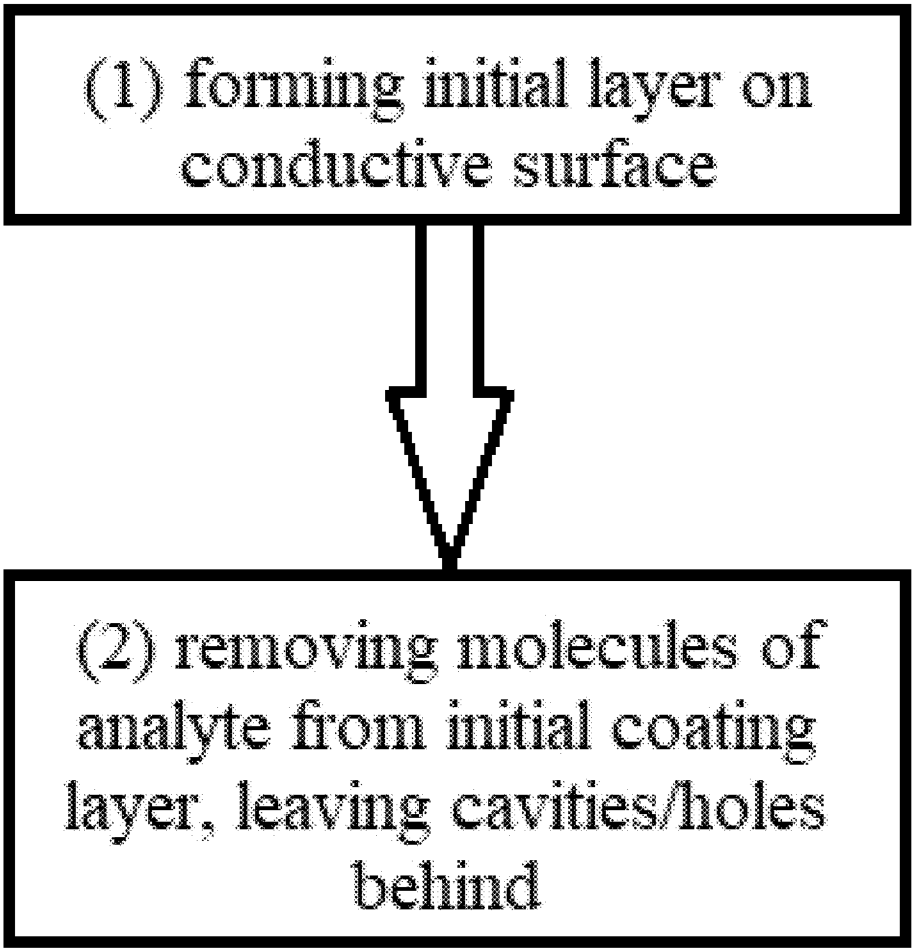
FIG. 4 is a flow chart of a method for preparing the sensing electrode as shown in FIG. 1, in accordance with exemplary embodiments of the present invention.

With reference to FIG. 4, various embodiments of the invention provide a method of preparing the sensing electrode as described above. The method includes step (1) of forming an initial layer embedded with molecules of the analyte 04 on the conductive surface 02S, and step (2) of removing the molecules of the analyte 04 from the initial coating layer and leaving the cavities 05 or holes 05 behind. In exemplary embodiments, the step (1) includes electrochemical polymerization of a mixture containing monomers and the analyte 04. However, the analyte 04 does not participate in the electrochemical polymerization but is imprinted into the polymerization product. The step (2) includes soaking the polymerization product from the step (1) in a solvent or a mixture of solvents, and optionally but preferably rinsing it with a solvent or a mixture of solvents prior to sensing tests.

In some exemplary embodiments, the step (1) comprises depositing a PFOA-imprinted film on a gold electrode by cyclic voltammetry in de-ionized (DI) water or phosphate buffered saline containing monomers of phenol, 3-hydroxyphenlurea, 2-(trifluoromethyl) acrylic acid and PFOA as the analyte 04. The step (2) may include soaking the product from the step (1) in methanol/water mixture and rinsing it with ethanol/water mixture prior to tests.

In other exemplary embodiments, the step (1) comprises depositing PFAS-imprinted polymer layer on the surface of a base sensor such as a glassy carbon sensor by cyclic voltammetry in precursor solution containing monomers of 4-(trifluoromethyl)benzene-1,2-diamine and 4-vinylaniline, and PFAS as the analyte 04 in de-ionized (DI) water, preferably using a "ramping" voltage for the electrochemical polymerization. The step (2) may include removing imprinted PFAS molecules with pure methanol solvent, followed by thorough DI treatment to eliminate methanol. In preferred embodiments, a step of conducting a crosslinking reaction on the product from the step (1) may be carried out before the step (2) starts. The crosslinking reaction may be conducted in a solvent such as heptane containing azobisisobutyronitrile (AIBN). The crosslinking reaction may be initiated by UV irradiation on vinyl groups in the product from the step (1); and terminated with a radical inhibitor such as 1,4-benzoquinone in a solvent such as heptane.

In preferred examples, two or more base electrodes 02 in a batch may be simultaneously subject to the step (1). The step (1) may include simultaneously forming the initial layers on the conductive surfaces of two or more base electrodes such as 2, 4 or 6 base electrodes in a batch. The two or more base electrodes 02 may be working electrodes placed in an electrochemical polymerization DPV system with a reference electrode 12 and a counter electrode 13. Preferably, said two or more working electrodes 02 and the counter electrode 13 are bundled together. The distance between each of the two or more base electrodes 02 to the counter electrode 13 is substantially the same to ensure uniformity and consistency between products of sensing electrodes 01. For example, the step (1) may include electrochemically polymerizing monomers and the analyte 04 in a container onto the two or more working electrodes 02 in the same container. The analyte 04 does not participate in the electrochemical polymerization but it is imprinted into the polymerization product.

Figure 5:
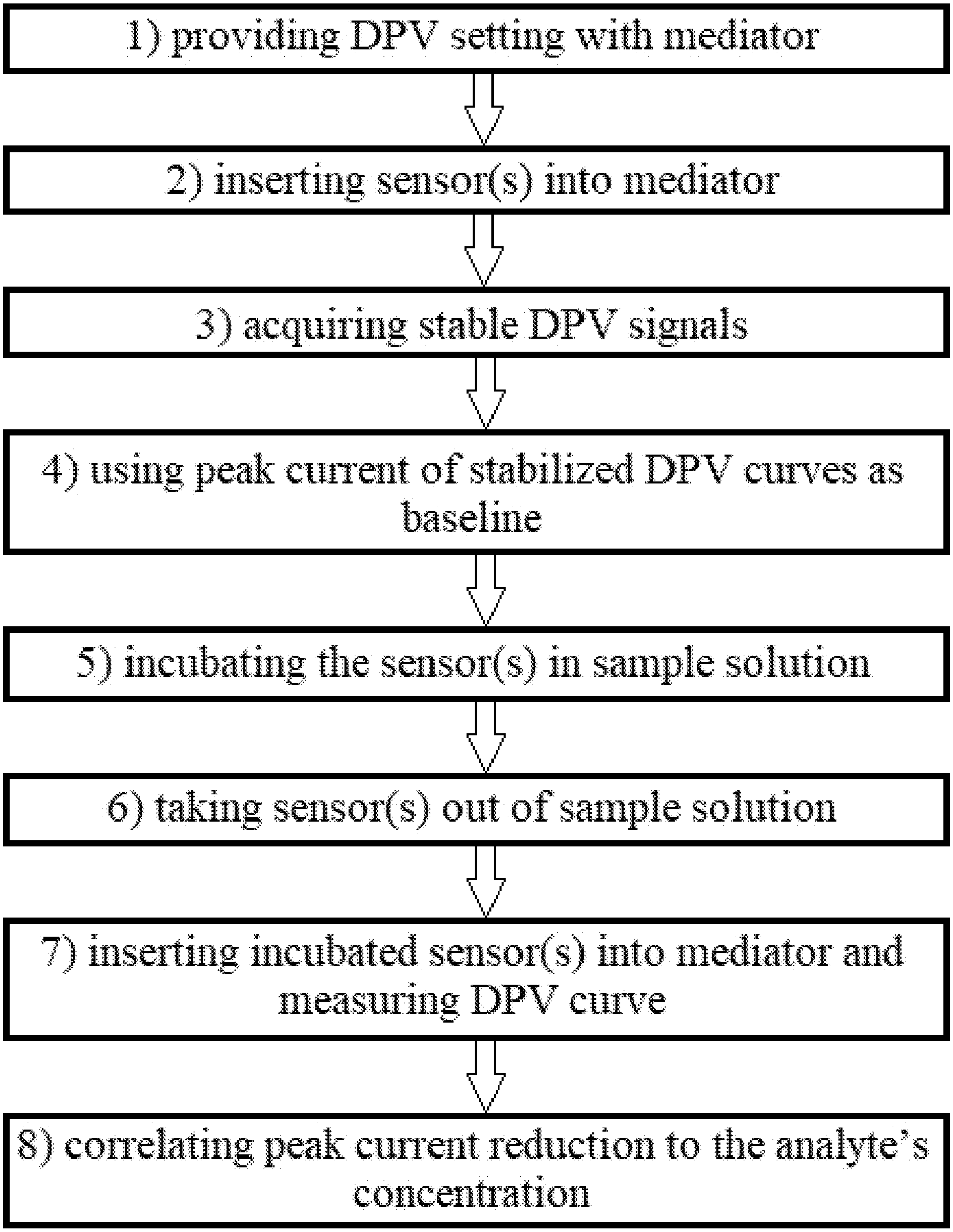
FIG. 5 is a flow chart of a method for determining the level of the analyte in a sample solution using the electrochemical sensing system as shown in FIG. 3, in accordance with exemplary embodiments of the present invention.

With reference to FIG. 5, various embodiments of the invention provide a method of determining the level of analyte 04 in a sample solution using the electrochemical sensing system 11*a* as shown in FIG. 3. In some specific examples, the method includes 1) providing a DPV setting with a mediator such as 2 mM FCA 7.4 buffer solution, 2) inserting the sensor(s) into the mediator such as the FCA solution, 3) acquiring stable DPV signals through tuning scanning parameters such as starting potential and quiet time, 4) using the peak current of stabilized DPV curves as the baseline for the detecting the analyte, 5) incubating the sensor(s) in a sample solution for a period such as 5-20 minutes, 6) taking the sensor(s) out of the sample solution and thoroughly rinsing the sensor(s) with the mediator such as the FCA solution, 7) inserting the incubated sensor(s) into the mediator such as the FCA solution and measuring DPV curve of the sample, and 8) correlating peak current reduction to the analyte's concentration in the sample solution.

In general embodiments, the present invention provides electrochemical sensors (an example of sensing electrode 01 in FIG. 1) for determination of analyte 04 such as PFAS in complex aqueous matrices. The embodiments also disclose fabrication of nano engineered electrochemical sensors for trace detection of PFAS in complex water matrices. Surfaces of electrochemical sensors were modified using molecular imprinting (MIP). Electrochemical sensors used in these tests include interdigital electrodes and conventional and modified circular electrodes, in combination with sensing mechanisms such as differential pulse voltammetry (DPV).

The embodiments further disclose development of PFAS sensor using DPV. In the development, DPV was used to detect PFOA by taking advantage of the amplification effect of mediators, such as ferrocyne carboxyl acid (FCA).

Example 1

In this Example, sensor assembly was completed first, for the purpose of determining individual PFAS (PFOA) in complex water matrices using MIP modified electrochemical sensors 01. PFOA-imprinted PPn film was first deposited on a BASi® screen printed electrode (an example of base electrode 02 in FIG. 1) by cyclic voltammetry in phosphate buffered saline (pH 7.4) containing monomers of 2.5 mM phenol, 2.5 mM 3-hydroxyphenlurea, 2.5 mM 2-(Trifluoromethyl)acrylic acid and templates of 1.5 mM PFOA. A conventional three-electrode electrochemical system was configured by connecting the BASi® electrode as the working electrode, Ag/AgCl as the reference electrode, and the platinum wire as the counter electrode. During the electrochemical polymerization, the working electrode was applied a "ramping" voltage by an Admiral Insutements (Ai) Squidstat™ Plus electrochemical station at a scanning rate of +/−1 mV/s between 0.0 to 0.9 V versus the reference electrode (Ag/AgCl) for 1 cycle typically. The platinum wire was connected as the counter electrode for current injection. The resultant MIP-functionalized BASi® screen printed electrode was then soaked in a 10 mL (1:1 v/v) methanol/water mixture for 20 minutes to remove the imprinted PFOA templates, followed by rinsing with ethanol/water mixture prior to tests.

Detection of PFOA in PBS by DPV: to evaluate the performance of the ultrathin MIP-modified BASi® screen printed electrode (an example of sensing electrode 01 in FIG. 1), differential pulse voltammetry (DPV) was employed in this report to characterize the electrode's response to varying concentrations of PFOA in phosphate buffered saline (pH 7.4) supplemented with mediator, ferrocyne carboxyl acid. The following parameters were used for all DPV measurements: Initial and final potentials vs. reference electrode were 0.0 and 0.4 V, respectively, with an amplitude of 0.1 V, a potential increment of 0.01 V, a pulse width of 0.1 s, a sample width of 0.0167 s and a pulse period of 0.5 s. Because the applied potential (≤0.4 V) was moderate, the inventors used the electrodes that are integrated within BASi® chip as the reference and counter electrodes for DPV tests.

The MIP-functionalized BASi® sensor was incubated in the phosphate buffered saline (PBS) (pH 7.4) containing 1 mM ferrocyne carboxyl acid, but without PFOA for 5 minutes, followed by scanning seven (7) DPV measurements. After changing to a new ferrocyne carboxyl acid PBS solution, the same fashion was repeated until the DPV signal stabilized. The resultant sensor was then exposed to a PBS solution containing PFOA for 5 minutes, followed by thorough rinsing with ferrocyne carboxyl acid PBS solution to remove any loosely attached PFOA molecules or other potential contaminants that could be left on the electrode surface. After incubating in a new ferrocyne carboxyl acid PBS solution for 5 minutes, DPV was pursued by seven (7) measurements. Similar fashion was repeated for other PFOA measurements.

Figure 6:
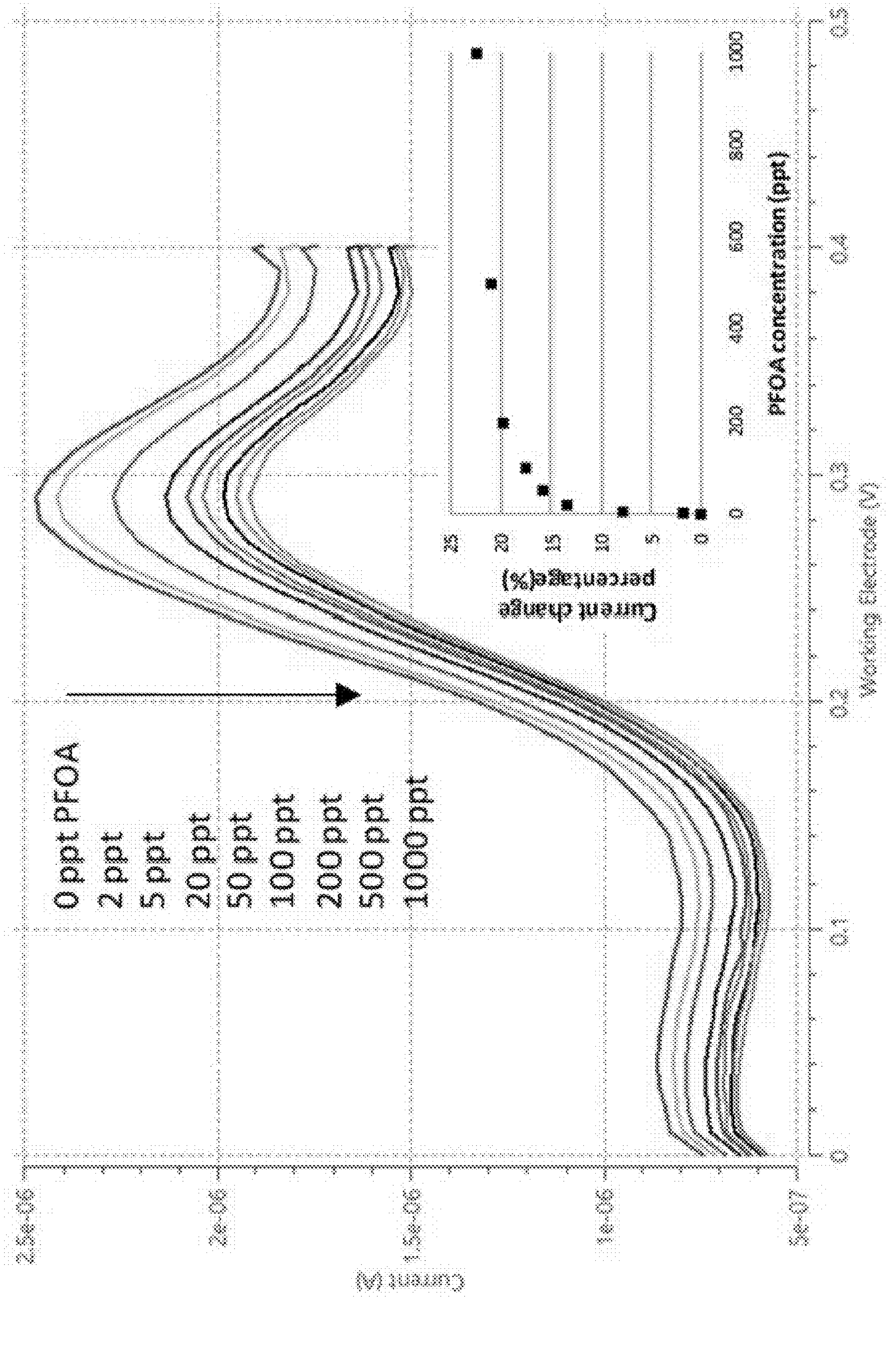
FIG. 6 shows DPV response in phosphate buffered saline (PBS) (pH 7.4) containing 1 mM ferrocyne carboxyl acid after exposure to different concentrations of PFOA in PBS, in accordance with an exemplary embodiment of the present invention.

As shown in FIG. 6, the oxidation potential of ferrocyne carboxyl acid, as observed, was 0.28 V vs Ag/AgCl, providing a decrease in current for ferrocyne carboxyl acid oxidation at the electrode surface with increasing concentration of PFOA. Therefore, the current value was recorded from the DPV curve at the potential of 0.28 V. To account for the variability and to enable more accurate comparison between sensors, the inventors normalized the current response to the initial current value using the following relationship: (io−i)/io*100%, in which "io" is the current response from the DPV in a ferrocyne carboxyl acid PBS solution containing zero (0) PFOA, and "I" is the current response from the DPV for each subsequent concentration of PFOA. This relationship, the "signal", was plotted vs. PFOA concentration and represents a first major assumption in data collection using differential pulse voltammetry. Plots of the signal as a function of PFOA concentration were first collected by exposing sensor to PFOA in PBS as a proof of concept to validate the use of ferrocyne carboxyl acid as a mediator. As shown in FIG. 6 insert, the calibration curve made using PBS as the matrix and ferrocyne carboxyl acid as the mediator showed a strong correlation relationship between current response and PFOA concentration. FIG. 6 shows DPV response in phosphate buffered saline (PBS) (pH 7.4) containing 1 mM ferrocyne carboxyl acid after exposure to different concentrations of PFOA in PBS. The insert in FIG. 6 shows percentage of current response, $(i_o-i)/i_o*100\%$, correlated to PFOA concentrations. Without being bound to any particular theory, it is believed that the decrease in current response upon PFOA concentration is caused by PFOA bindings onto MIP, which blocks the electron transfer between mediator and electrode surface. In other words, a decrease of conductivity of the sensing electrode 01 is correlated to an amount of cavities 05 or holes 05 that are filled with, bound to, or occupied by, the molecules of the analyte 04.

Detection of PFOA in artificial wastewater by DPV: following the construction of the calibration curves for PFOA in PBS, calibration curves were made in artificial wastewater samples to investigate sensor efficacy in a complex matrix. Feasibility of the MIP-coated BASi® sensor for detection of PFOA in wastewater was evaluated by assessing its response to different concentrations of PFOA in artificial wastewater (Universal Wastewater Standard, NSI Lab Solutions). The artificial wastewater from NSI Lab Solutions has a formulation listed below:

| | | | |
|---|---|---|---|
| BODS | 198 mg/L | pH | 6.9 units |
| CBOD | 163 mg/L | P•PO4 | 2.50 mg/L |
| COD | 309 mg/L | TDS | 600 mg/L |
| Conductivity | 650 umhos | TOC | 121 mg/L |
| N—NH3 | 7.50 mg/L | Total Solids | 800 mg/L |
| N—NO3 | 3.00 mg/L | TSS | 100 mg/L |
| Total Nitrogen | 24.6 mg/L | | |

Similarly, the MIP-functionalized BASi® sensor was incubated in the phosphate buffered saline (PBS) (pH 7.4) containing 2 mM ferrocyne carboxyl acid, but without PFOA for 5 minutes, followed by scanning seven (7) DPV measurements. It should be noted that enhanced ferrocyne carboxyl acid concentration was designed to reduce the background noise. After changing to a new ferrocyne carboxyl acid PBS solution, the same fashion was repeated until the DPV signal stabilized. The resultant sensor was then exposed to an artificial wastewater sample containing PFOA for 5 minutes, followed by thorough rinsing with ferrocyne carboxyl acid PBS solution to remove any loosely attached PFOA molecules or other potential contaminants that could be left on the electrode surface. After incubating in a new ferrocyne carboxyl acid PBS solution for 5 minutes, DPV was pursued by seven (7) measurements. Similar fashion was repeated for other PFOA measurements.

Figure 7:
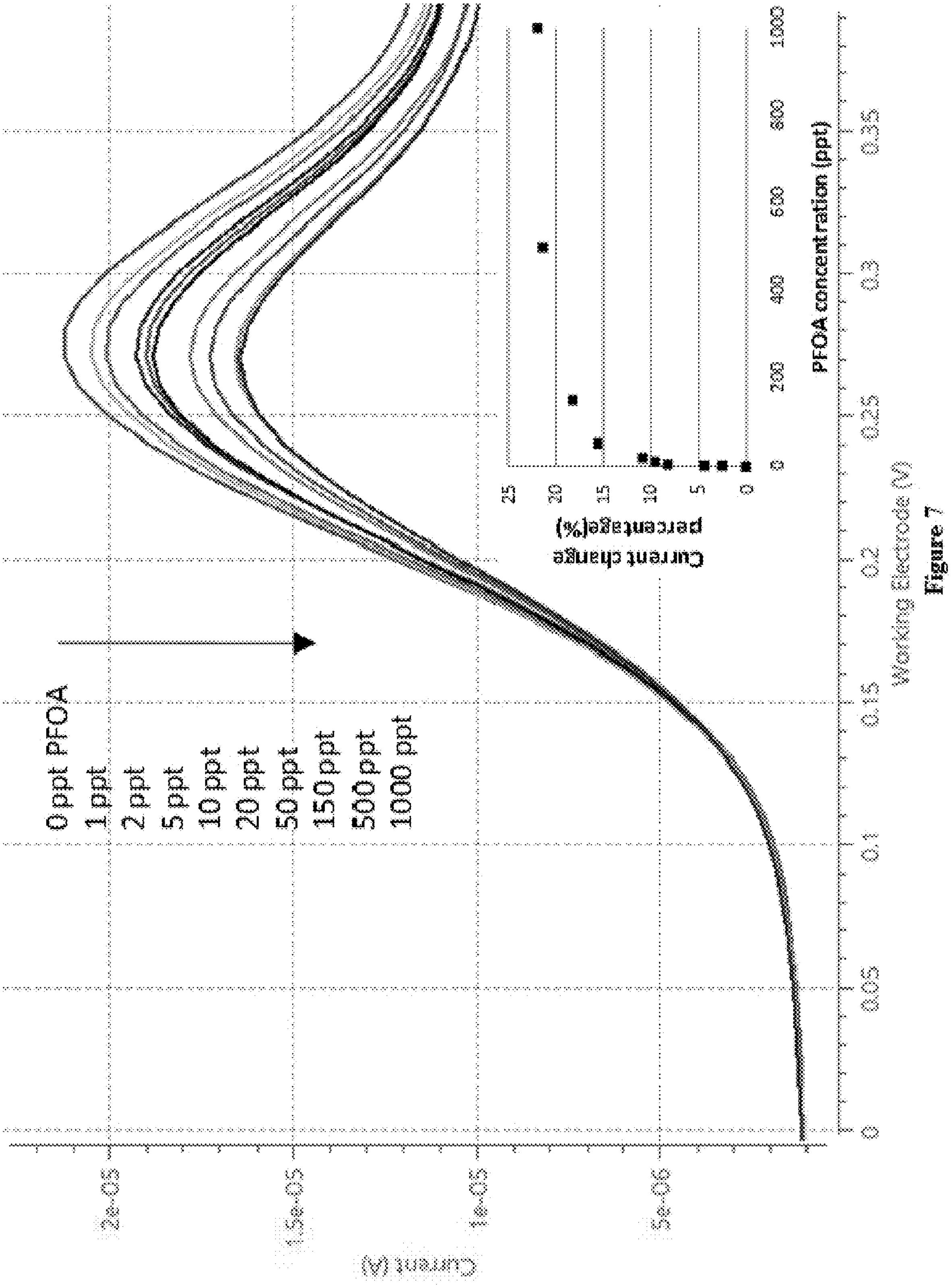
FIG. 7 shows the DPV response curves of MIP-coated BASi® sensor in phosphate buffered saline (PBS) (pH 7.4) containing 2 mM ferrocyne carboxyl acid after exposure to different concentrations of PFOA in artificial wastewater samples, in accordance with exemplary embodiments of the present invention.

FIG. 7 shows the DPV response curves of MIP-coated BASi® sensor in phosphate buffered saline (PBS) (pH 7.4) containing 2 mM ferrocyne carboxyl acid after exposure to different concentrations of PFOA in artificial wastewater samples. The insert in FIG. 7 shows percentage of current response, (io−i)/io*100%, correlated to PFOA concentrations; and it depicts the corresponding change percentage of current versus PFOA concentrations in wastewater solutions. The peak current as measured by DPV decreased in response to increasing PFOA concentration (FIG. 7 insert), with the reduction in peak current responses like that observed in FIG. 6.

Figure 8:
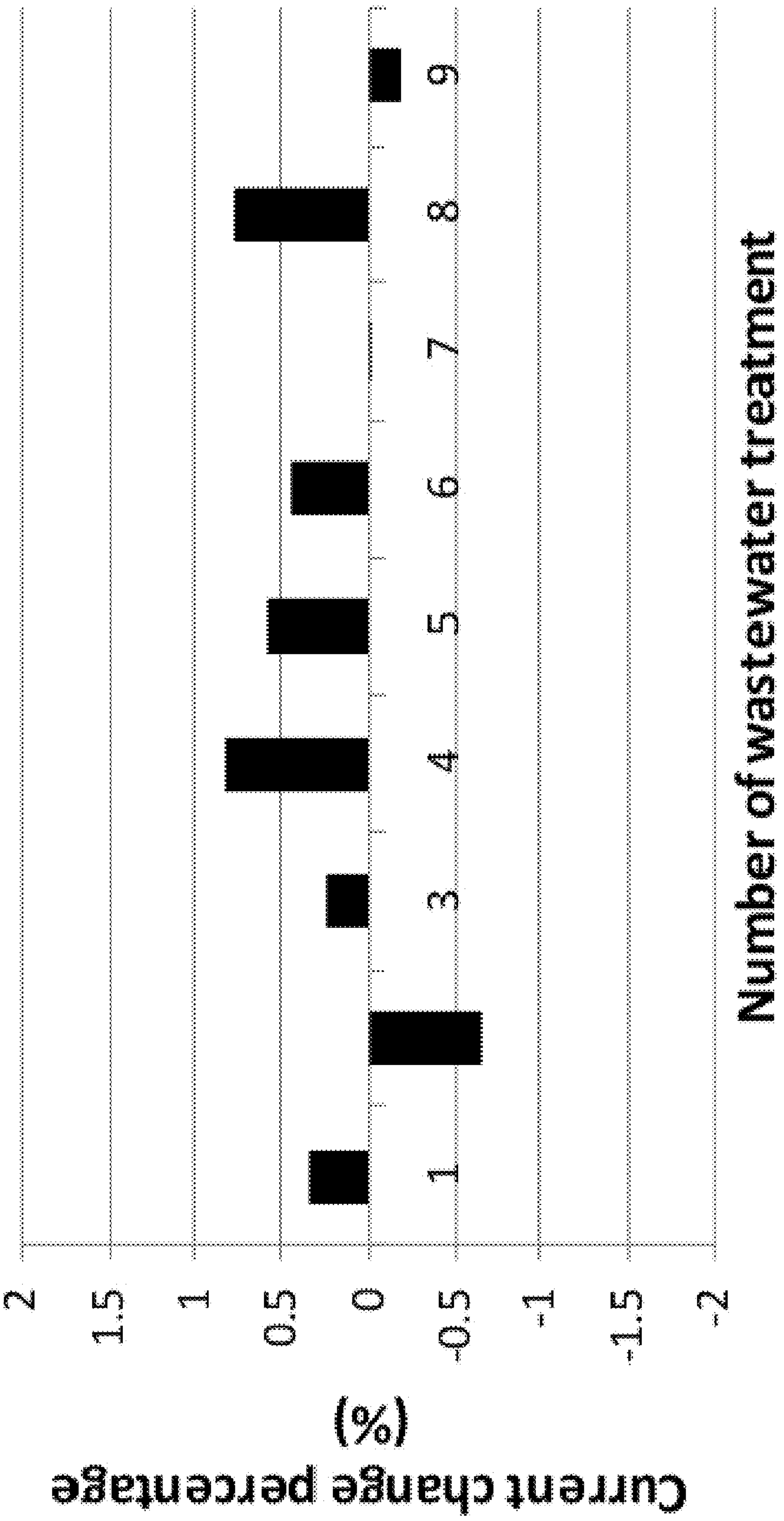
FIG. 8 shows percentage of DPV current response, (io−i)/io*100%, in phosphate buffered saline (PBS) (pH 7.4) containing 2 mM ferrocyne carboxyl acid after rendering the sensor to the treatment of artificial wastewater, in accordance with exemplary embodiments of the present invention.

In order to reveal whether the observed signal change originated from PFOA bindings, a set of control experiments was conducted by rendering the sensor to the same fashion of detection without containing any PFOA in wastewater. FIG. 8 shows percentage of DPV current response, (io−i)/io*100%, in phosphate buffered saline (PBS) (pH 7.4) containing 2 mM ferrocyne carboxyl acid after rendering the sensor to the treatment of artificial wastewater. FIG. 8 clearly shows that the DPV current change induced by the experimental treatment of wastewater stayed within the noise level. These results indicate that (1) the MIP-coated BASi® sensor is capable of sensitive detection of less than 5 ppt levels of PFOA in a complex matrix, and (2) it doesn't show degradation impact on detection performance for wastewater sample, which strongly suggests the functionality of the MIP-coated BASi® sensor for field determination of PFOA.

Figure 9:
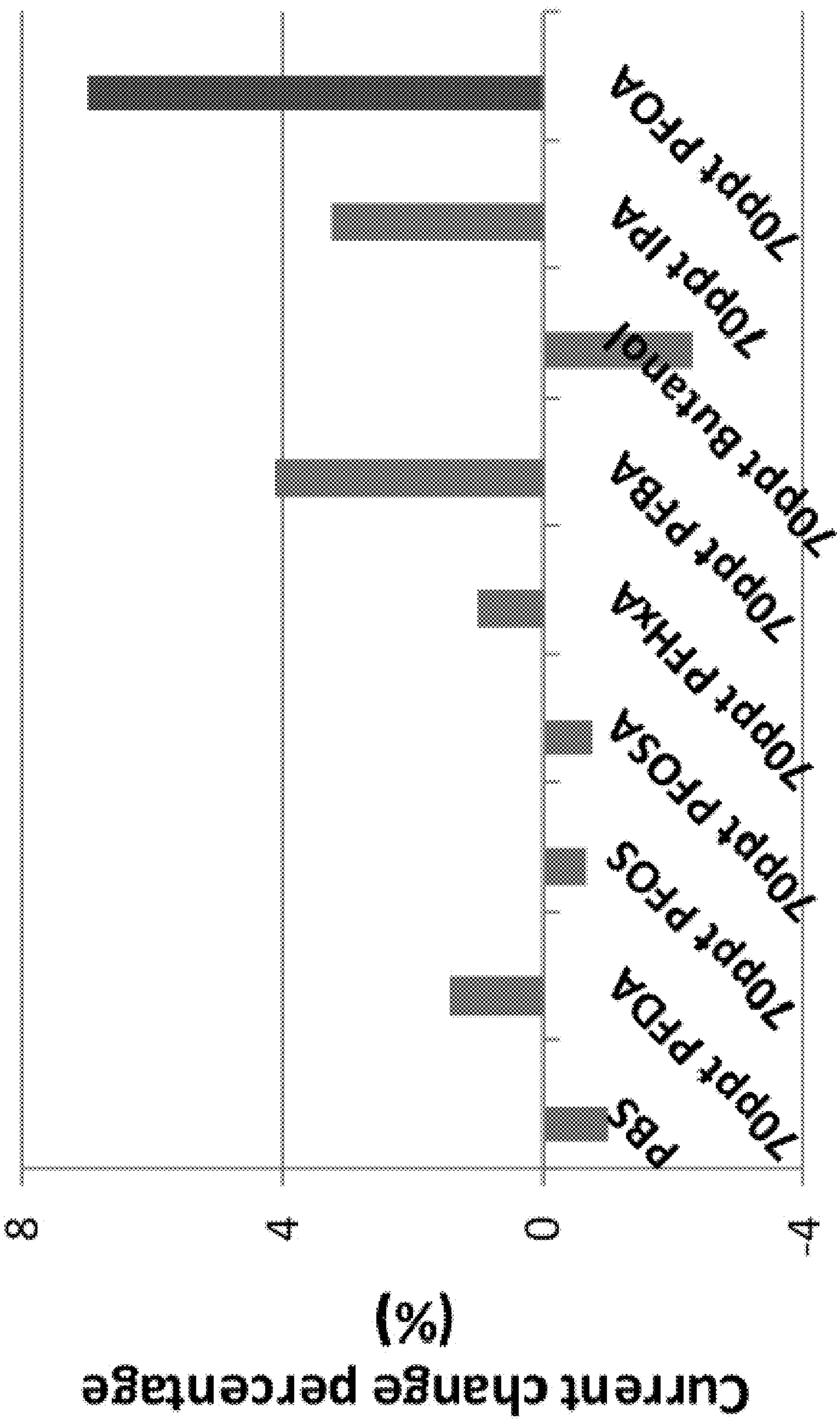
FIG. 9 records percentage of DPV current response, (io−i)/io*100%, in phosphate buffered saline (PBS) (pH 7.4) containing 2 mM ferrocyne carboxyl acid after rendering the sensor to the PBS solutions containing zero (control), 70 ppt PFDA, PFOS, PFOSA, PFHxA, PFBA, Butanol, IPA and PFOA, respectively, in accordance with exemplary embodiments of the present invention.

Determination of specificity: the performance of MIP-modified BASi® screen printed electrode sensor was evaluated by experiments designed to test specificity. For these experiments, five (5) PFOA analogues and two (2) organic chemicals were employed. In particular, the response of the sensor to a variety of analytes, namely, PFOA, PFDA, PFOS, PFOSA, PFHxA, PFBA, and Butanol and IPA as well as to a blank PBS solution as control was assessed and compared. Similarly, differential pulse voltammetry (DPV) was employed in this step to characterize the electrode's response to 70 ppt analytes in PBS (pH 7.4) supplemented with mediator (ferrocyne carboxyl acid). The following parameters were used for all DPV measurements in this step: Initial and final potentials vs. reference electrode were 0.0 and 0.4 V, respectively, with an amplitude of 0.1 V, a potential increment of 0.01 V, a pulse width of 0.1 s, a sample width of 0.0167 s and a pulse period of 0.5 s. Taking PFOA as example, the MIP-functionalized BASi® sensor was incubated in a blank phosphate buffered saline (PBS) (pH 7.4) for 5 minutes, followed by changing to a PBS solution containing 2 mM ferrocyne carboxyl acid and scanning seven (7) DPV measurements. The same fashion was repeated until the DPV signal stabilized to achieve the current response ($i_o$) for a PBS solution containing zero (0) PFOA. The resultant sensor was then exposed to a PBS solution containing 70 ppt PFOA for 5 minutes, followed by thorough rinsing with 2 mM ferrocyne carboxyl acid PBS solution to remove any loosely attached PFOA molecules or other potential contaminants that could be left on the electrode surface. After incubating in a new ferrocyne carboxyl acid PBS solution for 5 minutes, the current response (i) for 70 ppt PFOA was pursued by seven (7) DPV measurements. Similar fashion was conducted for other 70 ppt analyte tests. Their corresponding current change percentage, $(i_o-i)/i_o*100\%$, are depicted in FIG. 9. FIG. 9 records percentage of DPV current response, (io−i)/io*100%, in phosphate buffered saline (PBS) (pH 7.4) containing 2 mM ferrocyne carboxyl acid after rendering the sensor to the PBS solutions containing zero (control), 70 ppt PFDA, PFOS, PFOSA, PFHxA, PFBA, Butanol, IPA and PFOA, respectively. As illustrated in FIG. 9, the current change percentage of the MIP-modified BASi® sensor induced by PFOA was significantly higher than that of most analogues except PFBA. The results show that most of the tested analogues cannot effectively enter the template cavities (an example of cavities 05 in FIG. 1) on the surface of the sensor to block electron transfer between mediator of ferrocyne carboxyl acid and electrode surface because the recognition sites of the imprinted cavities are not complementary to them. Among them, PFBA showed considerable impact on sensor, which may be due to its relatively small size and similar structure to PFOA, allowing PFBA to sufficiently interact with the binding cavities 05 within MIP. IPA seems to induce a substantial change as well, which may be caused by its swelling effect.

Figure 10:
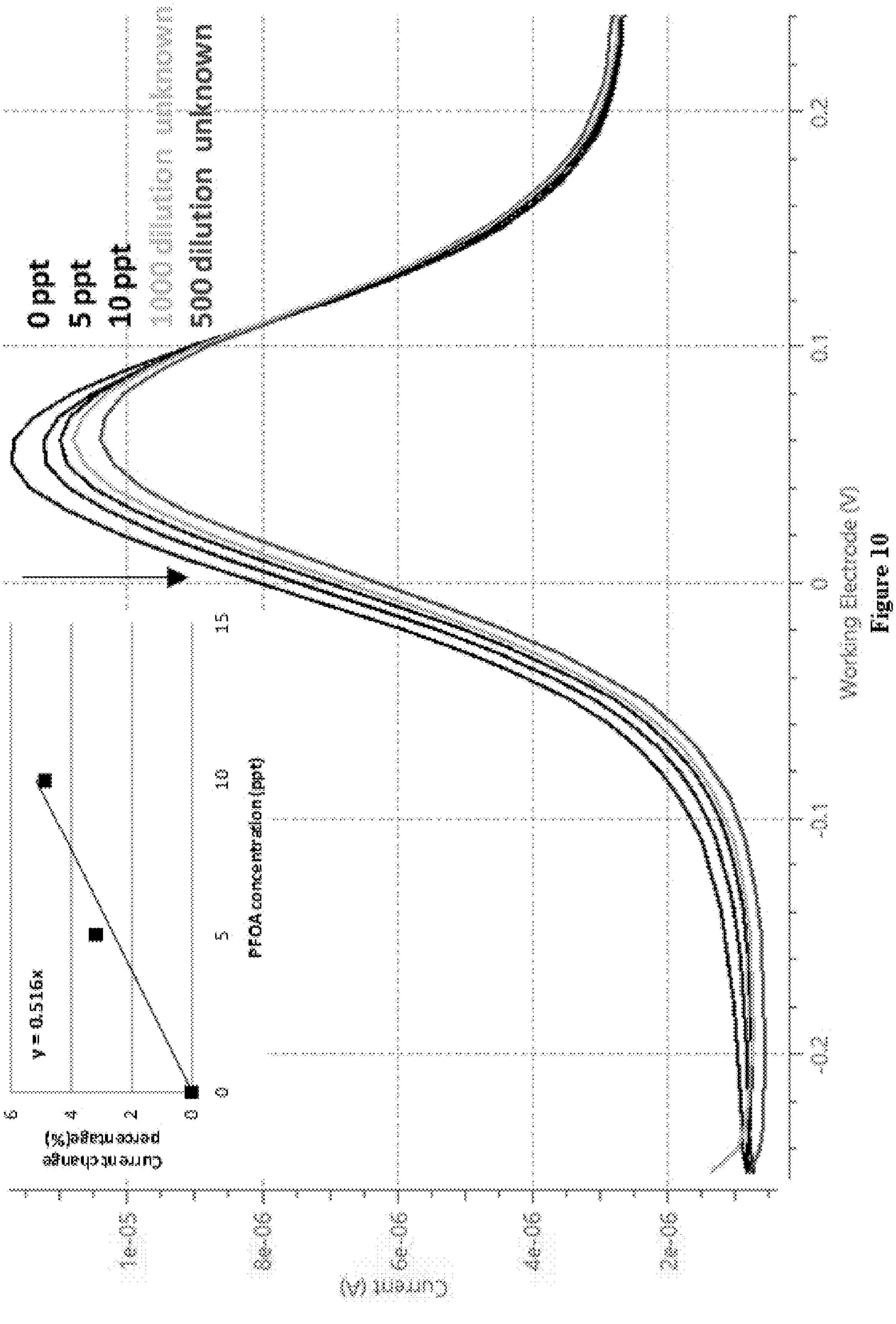
FIG. 10 shows the DPV response in PBS containing 2 mM ferrocyne carboxyl acid after exposure to some actual sample solutions, in accordance with exemplary embodiments of the present invention.

Determination of PFOA in actual samples: the PFOA determination capability of the sensor in real samples was evaluated using sample solutions collected by elateq (https://www.elateq.com/). Two PFOA sample solutions were provided by elateq: before (1ROP_0 4/22) and after (1ROP_11 4/22) PFOA removal. These two sample solutions were diluted 1000 times and 500 times for evaluation. Prior to testing in diluted samples, a calibration curve (FIG. 10 insert) was established using three PBS solutions containing zero (0), 5 and 10 ppt PFOA. The detailed experimental procedures were same or similar as that described above. Following the construction of the calibration curves for PFOA, the sensor was tested for its DPV response in 2 mM ferrocyne carboxyl acid PBS solution after exposing to 1000 times and 500 times diluted elateq samples for 5 minutes, respectively. FIG. 10 shows the DPV response in phosphate buffered saline (PBS) (pH 7.4) containing 2 mM ferrocyne carboxyl acid after exposure to PFOA PBS solutions (top 3 curves) containing zero (0), 5 ppt, 10 ppt, and 1000 times diluted (the $4^{th}$ lowest curve) and 500 times diluted (the lowest curve) actual sample solutions (1ROP_0 4/22). FIG. 10 insert shows the calibration curve of percentage of current response, (io−i)/io*100%, correlated to PFOA concentrations. The obtained current change percentage values, $(i_o-i)/i_o*100\%$, were input to the calibration curve for PFOA concentration values, followed by multiplying their corresponding dilution factors. Similar fashion was conducted for the sample (1ROP_11 4/22). By comparing the values for the samples before and after PFOA removal, a removal efficiency of 85% was calculated, which is in well agreement with the 90% removal efficiency determined by elatq using LC-MS.

In this Example, development and feasibility of PFOA sensors based on differential pulse voltammetry (DPV) was demonstrated successfully. The PFOA sensing media was constructed by electrochemically polymerizing an ultrathin PFOA-imprinted polymer onto the flat gold electrode surface within a commercialized screen-printed electrode (BASi®). The sensor showed remarkable sensitivity to PFOA (1 ppt level), rapid response (within minutes), wide dynamic range ranging to 1 ppb and remarkable selectivity against interferences including PFDA, PFOS, PFOSA, and PFHxA. Capability of PFOA determination in actual samples was demonstrated using the sample solutions provided by elateq. The determined PFOA removal efficiency (85%) was in well agreement with the value determined by elateq using LS-MS, indicating a quick and low-cost determination method for polyfluoroalkyl substances.

Example 2

In this Example, glassy carbon electrodes (GCEs, an example of base electrode 02 in FIG. 1) were used to fabricate MIP sensors (an example of sensing electrode 01 in FIG. 1) for PFAS detection. GCE is preferred in electrochemical applications because of its remarkable properties such as low cost, excellent electrical conductivity, electrochemical inertness over a broad potential window, high hardness, chemical stability, impermeability, and ease of surface modification. A reason for selecting GC electrodes for fabrication of MIP sensors is compatibility of GC (the conductive surface 02*s* thereof in FIG. 1) with the MIP material used for forming coating layer 03 in FIG. 1.

Figure 11:
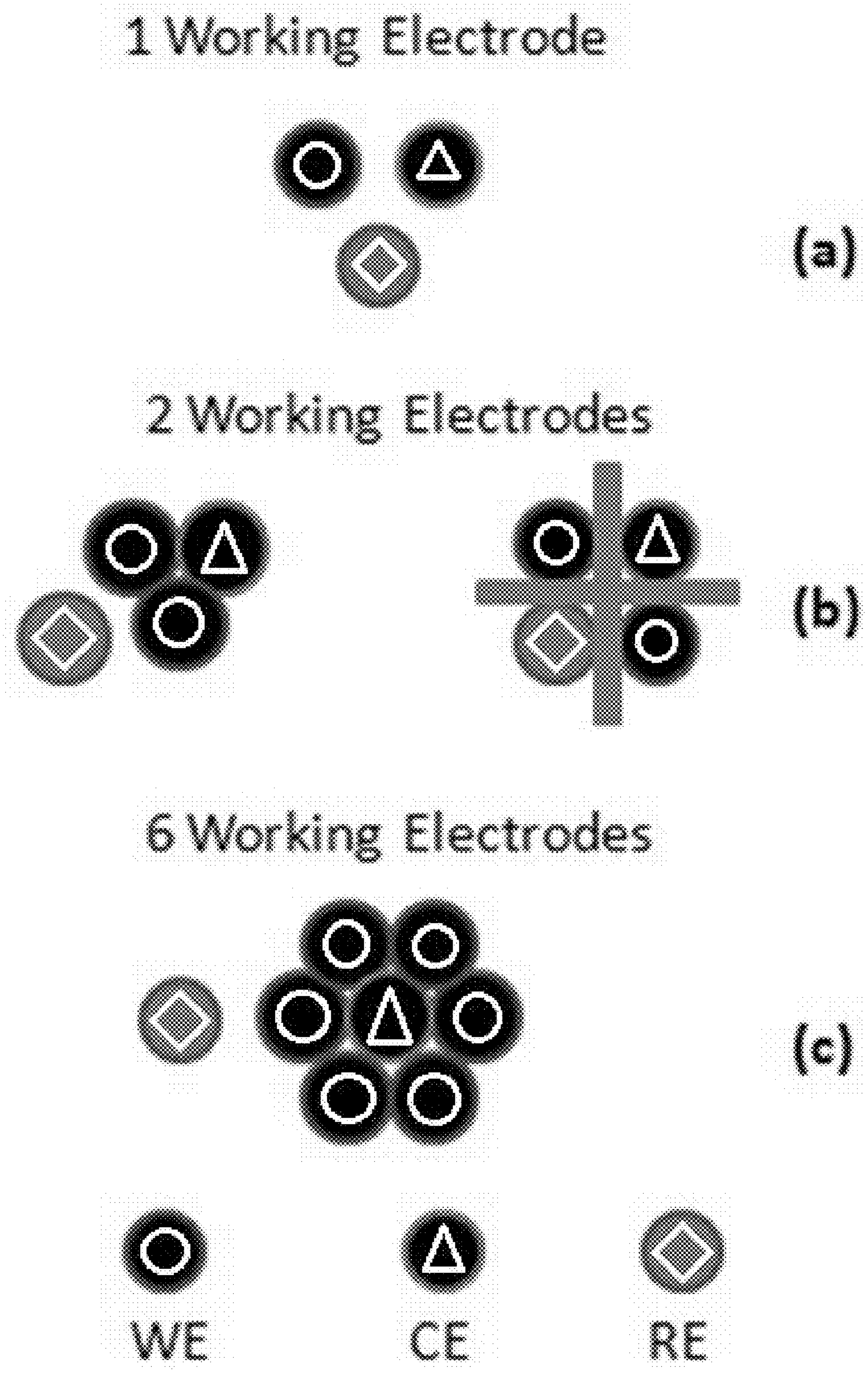
FIG. 11 is cross-sectional views illustrating arrangements of GCEs for fabrication of one or more sensing sensors in one batch, in accordance with exemplary embodiments of the present invention.

Different electrode arrangements were used to polymerize MIP monomers to fabricate MIP sensors, including a single sensor, two sensors, and 6 sensors in one batch, as shown in FIG. 11. To minimize sensor to sensor variations, the separation distance between the working electrode and the counter electrode in one batch should be the same/as close as possible, on which these arrangements are based. FIG. 11 is cross-section views illustrating arrangements of GCEs for fabrication of 1 sensing sensor (panel a), two sensing sensors (panel b) and 6 sensing sensors (panel c) in one batch.

Figure 12:
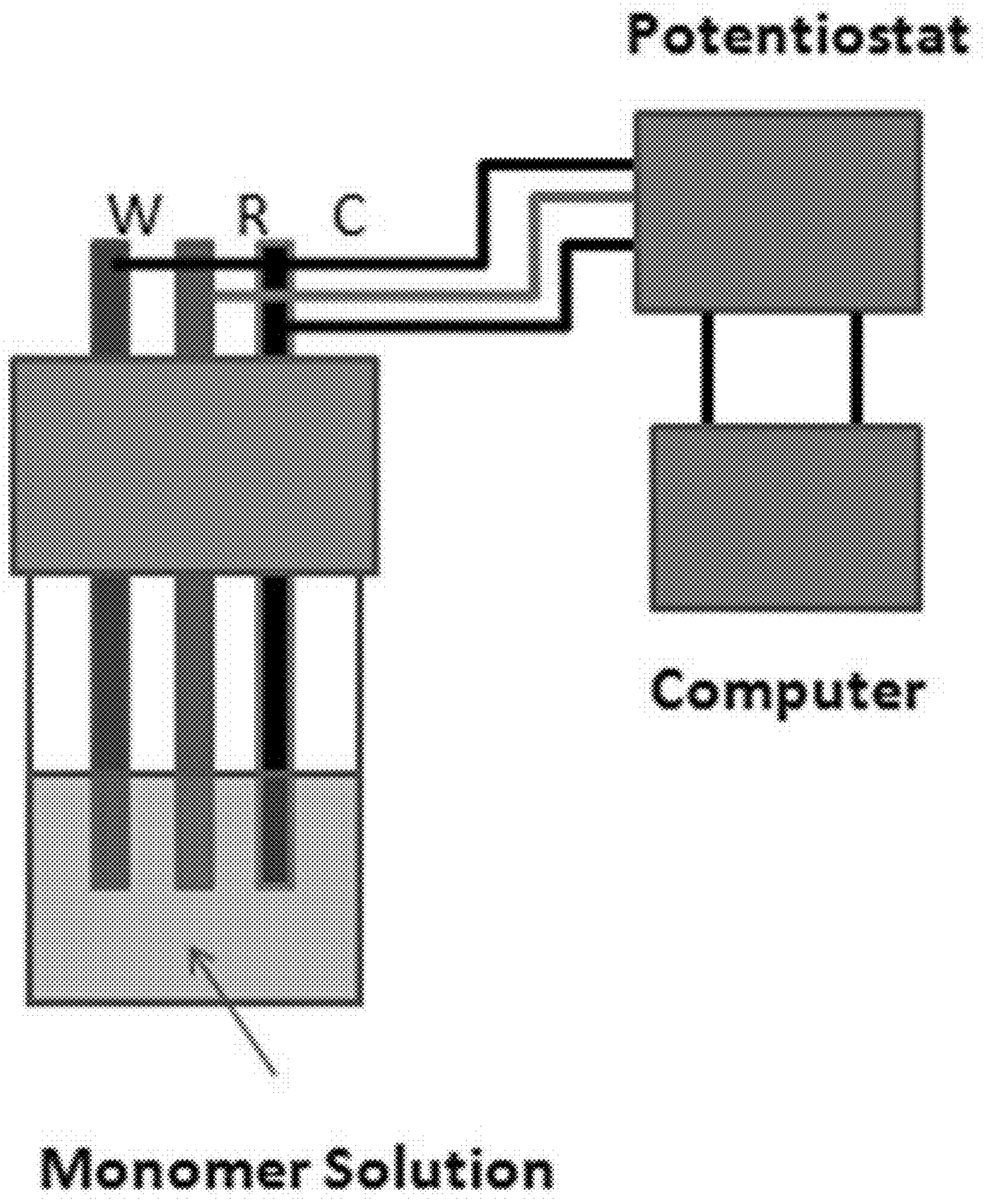
FIG. 12 is a schematic diagram of experimental set-up for fabrication of MIP sensors, in accordance with exemplary embodiments of the present invention.
Figure 13:
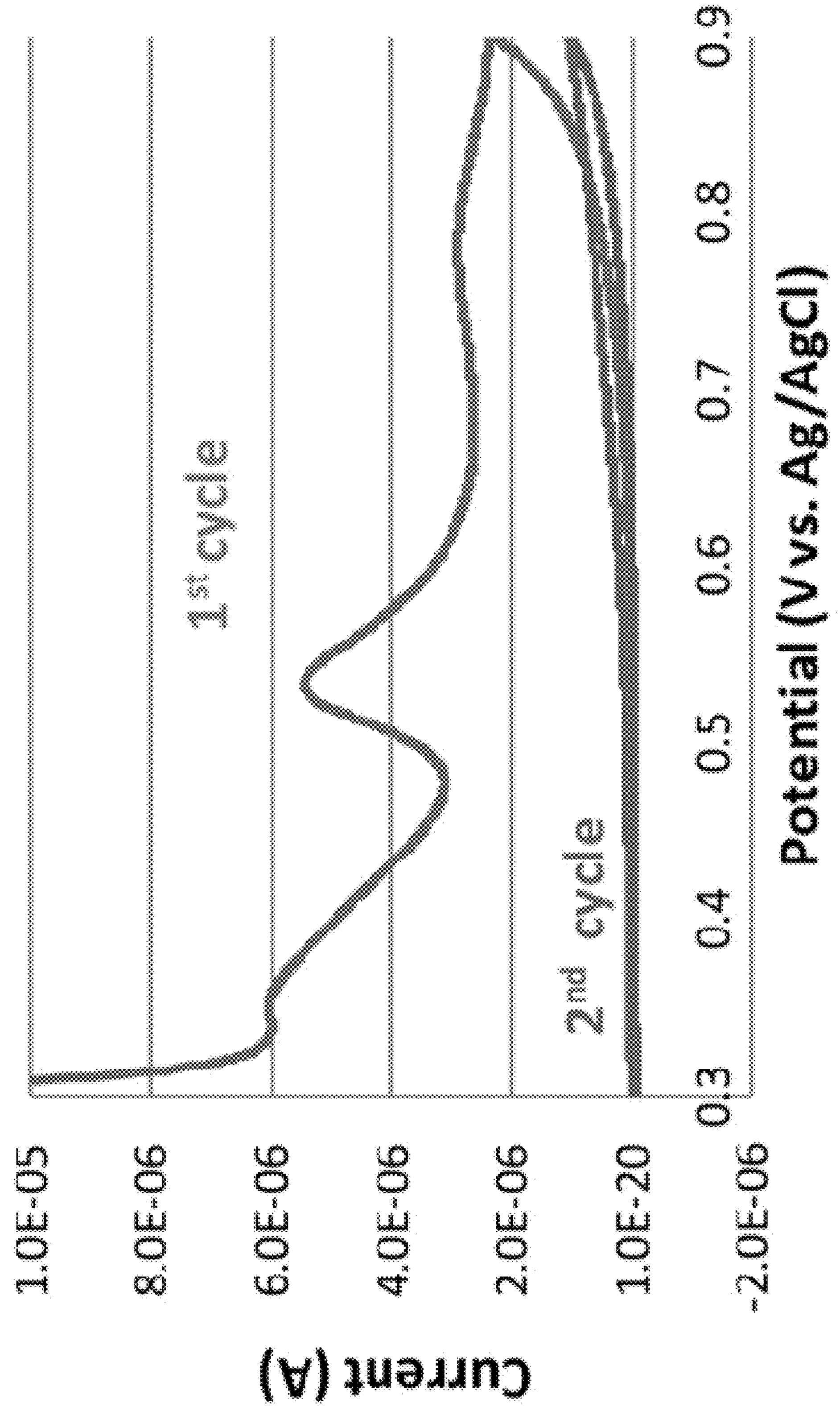
FIG. 13 shows typical polymerization curves (2 cycles) for sensor fabrication on glassy carbon electrode, in accordance with exemplary embodiments of the present invention.

With respect to the fabrication of a single sensor in one batch, a schematic diagram of experimental set-up for fabrication of MIP sensors is shown in FIG. 12. The formulation of monomer solution is the same as described in Example 1. Typical polymerization curves (2 cycles) for sensor fabrication on glassy carbon electrode are shown in FIG. 13.

With respect to the fabrication of multiple sensors in one batch, it is preferred to fabricate multiple sensors with minimized sensor to sensor variation. Multiple working electrodes and one counter electrode are needed to be bundled together with the same working electrode to counter electrode distance. The arrangements for 2 electrodes and 6 electrodes are shown in panels (b) and (c) in FIG. 11.

Sensors fabricated on glassy carbon electrode were evaluated using conventional sensor evaluation set-up, integrated sensor evaluation set-up, and a dual sensor system for field applications.

Figure 14:
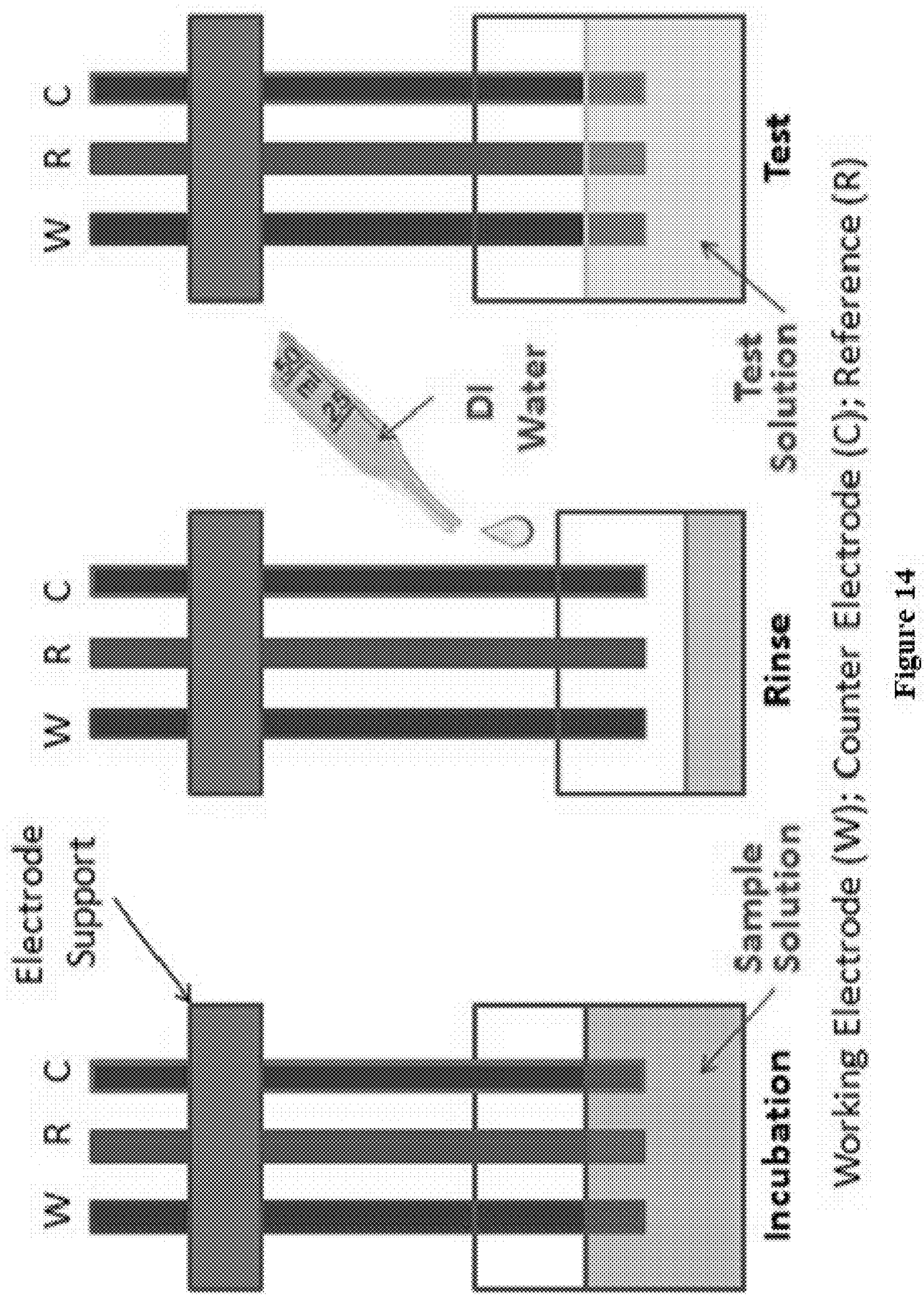
FIG. 14 schematically illustrates a test procedure of the sensing sensor using a conventional sensor evaluation set-up, in accordance with exemplary embodiments of the present invention.

To evaluate the MIP sensor, a test procedure was developed using the conventional sensor evaluation set-up. The procedure was divided into three main steps, incubation, rinse, and test, as schematically shown in FIG. 14. In the incubation step, the electrodes (WE, CE, and RE) were attached to a support, and incubated in a sample solution of PFAS for a defined period of time. Then the electrodes were rinsed using DI water to remove residuals of sample solution. Finally, the electrodes were positioned in a test solution containing redox species for DPV measurement. The peak current values of obtained DPV curves decreased with increasing PFAS concentration in the sample solution. Decreasing percentages of peak current of the DPV curves can be correlated to the concentration of PFAS.

Figure 15:
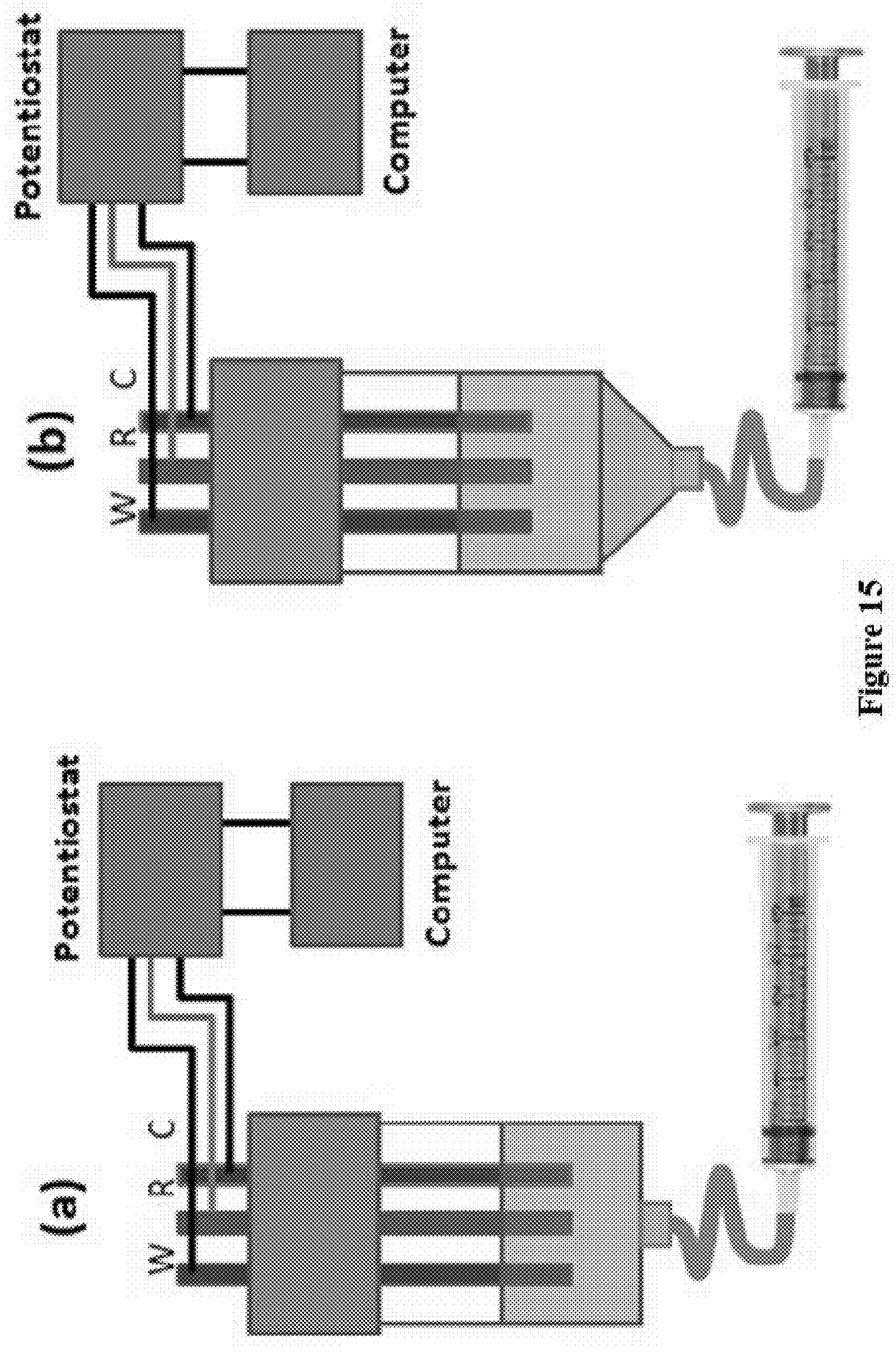
FIG. 15 schematically illustrates an integrated sensor evaluation set-up for a portable PFAS sensing system, in accordance with exemplary embodiments of the present invention.

To integrate the sensors into a portable PFAS sensing system, an integrated sensor evaluation set-up as shown in FIG. 15 was invented. A component of the set-up is a clear plastic container with an opening at the bottom connected to a syringe through flexible tubing (an example of the filling/draining device 18 in FIG. 3). Sample, rinsing, and test solutions can be injected into the container through the syringe. The container shown in panels (a) and (b) in FIG. 15 has a flat and coned bottom, respectively. The container in panel (b) with a coned bottom is preferred for sensor testing because much less solution residuals are left after each step.

Figure 16:
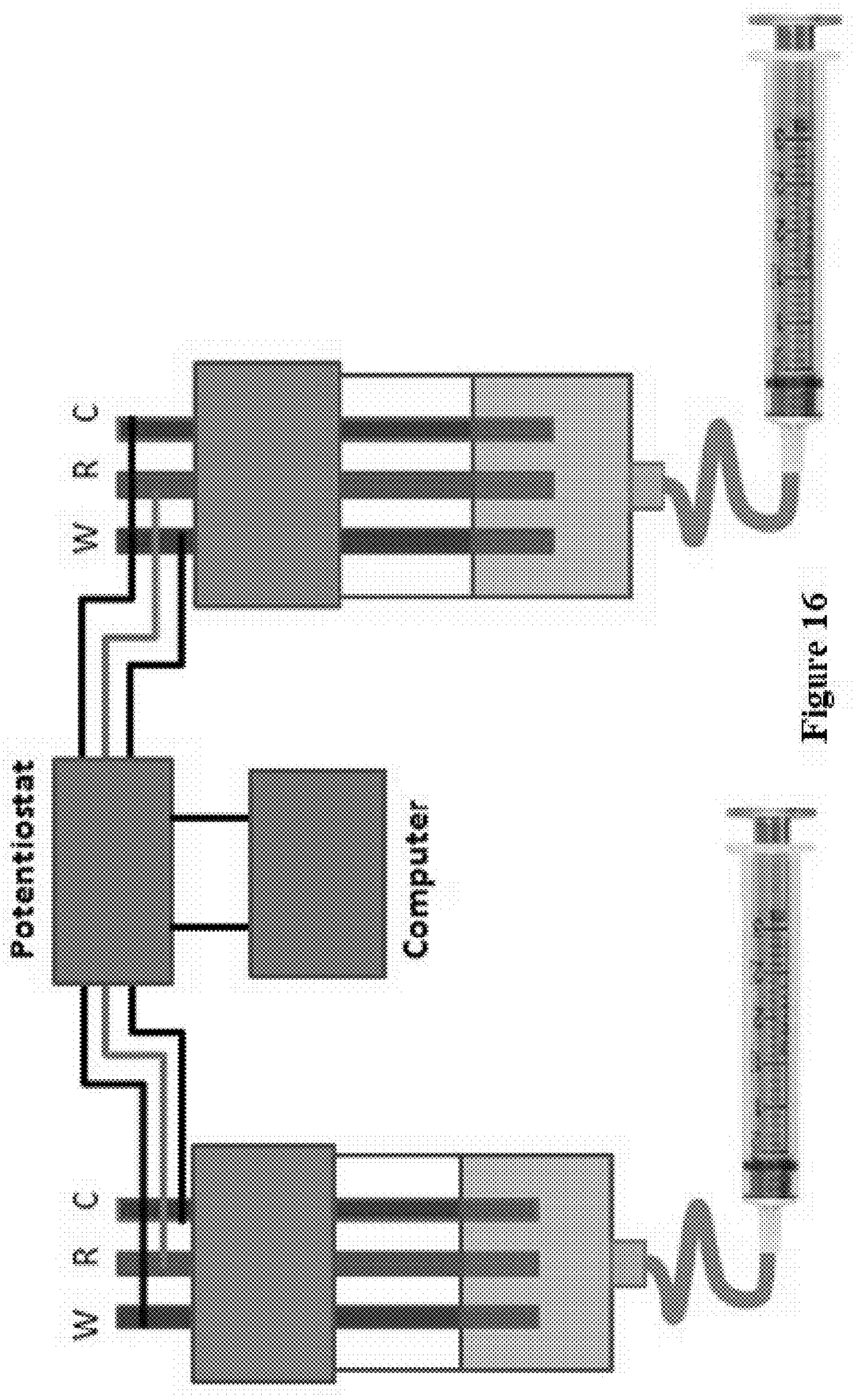
FIG. 16 schematically illustrates a dual sensor system for field application, in accordance with exemplary embodiments of the present invention.

Due in part to the high sensitivity of the DPV sensors (down to 1 ppt), it becomes very important to stabilize the baseline signal for PFAS detection using the DPV sensor. A dual sensor system as shown in FIG. 16 was designed, in which one sensor (detection sensor) will be exposed to sample solutions during the incubation step while the other (reference sensor) will stay in a solution with NO PFAS. Because both sensors are imprinted using the same type of substance as template, the properties of the formed MIPs such as porosity are expected to be identical. Consequently, the impact on two sensors, originating from the accommodation process of polymer, is expected to be equivalent, which can be circumvented by neutralization or cancellation of each other in the dual sensor design.

Example 3

This Example is related to procedures of MIP assembly for DPV detection of PFASs. A high degree of selectivity and stability of MIP is required to develop MIP-based electrochemical sensor. The sensor's selectivity is imparted by the molecularly-imprinted polymer (MIP) layer directly deposited by electrochemical polymerization onto the sensor surface. The formed MIP is also considered to be a determining factor for the sensor's stability. Work on the development of MIPs in this Example reveals that maximizing the stability and selectivity of MIPs has been best achieved by controlling six factors or steps.

The first factor is monomers with specific functional groups. PFAS-imprinted polymer layer is first deposited on sensor surface by cyclic voltammetry in precursor solution containing monomers of 4-(trifluoromethyl)benzene-1,2-diamine and 4-vinylaniline, and templates of PFASs. MIPs made of molecules of 4-(trifluoromethyl)benzene-1,2-diamine can provide more specific binding towards PFASs with fluoro-carbon and amine groups, in contrast to current MIPs designed for detection of PFASs.

The second factor is electrochemical polymerization with suitable window. A conventional three-electrode electrochemical system was configured by connecting a cleaned electrode such as gold or glass carbon as the working electrode (WE), Ag/AgCl as the reference electrode (RE), and a glass carbon electrode as the counter electrode (CE). During the electrochemical polymerization, the working electrode was applied a "ramping" voltage by an Admiral Instruments (Ai) Squidstat™ Plus electrochemical station at a scanning rate of +/−3.3 mV/s between a suitable range versus the reference electrode (Ag/AgCl) for 2 repeated cycles typically. The polymerization window is designed to form more uniform MIPs if the precursor solution contains more than one electrochemically polymerizable monomer. For monomers of 4-(trifluoromethyl)benzene-1,2-diamine and 4-vinylaniline, a polymerization window of 0.7-0.8V is chosen to pursue a simultaneous polymerization of the two monomers, resulting in random polymer rather than block polymer. Block polymer is less preferred because it usually has phase separation issue, leading to unexpected dysfunction of MIP.

The third factor is electrochemical polymerization in ion-minimized environment. The electrochemical polymerization is conducted in de-ionized (DI) water with aim of minimizing or reducing the ion-sensitivity of the formed MIPs.

The fourth factor is an additional crosslinking reaction. The electrochemically polymerized electrodes further went through a crosslinking reaction in heptane solvent containing azobisisobutyronitrile (AIBN). Crosslink was initiated by UV irradiation on vinyl groups in MIP matrix, which are possessed by 4-vinylaniline monomer. Following UV irradiation in the presence of AIBN, the electrodes were kept in pure heptane solvent for more than hours with NO UV. Use of heptane is important because the solubility of PFASs in heptane is extremely low. Therefore, the imprinted PFASs can persist within MIP matrix after the crosslinking reaction.

The fifth factor is termination of the crosslinking reaction. Prior to PFAS removal, the crosslinking process was completely terminated so that the formed binding cavity is not blocked due to the crosslinking. Radical inhibitor of 1,4-benzoquinone in heptane is used to terminate the reaction.

The sixth factor is PFAS removal. Molecules of imprinted PFASs were removed using pure methanol solvent, followed by thorough DI treatment to eliminate the potential impact of methanol. The MIP-electrodes were kept in DI from light under room temperature before use.

Example 4

Procedures of DPV Detection of PFASs

With reference to FIG. 5, various embodiments of the invention provide a method of determining the level of analyte 04 in a sample solution using the electrochemical sensing system 11*a* as shown in FIG. 3. In this Example, differential pulse voltammetry (DPV) was employed for detection of PFASs. The detailed procedures are given in the following.

Materials: sample solution (10 ml), synthetic solution (30 ml), 0.5 M ferrocene carboxylic acid (FCA) in 0.1 N phosphate buffer solution (60 ml), de-ionized (DI) water (100 ml), prepared sensor (1), cleaned glass carbon electrode (1), silver/silver chloride (Ag/AgCl) electrode (1), and Admiral Instruments (Ai) Squidstat™ Plus electrochemical station (1).

Testing setup: A conventional three-electrode electrochemical system was configured by connecting an assembled sensor as the working electrode (WE), Ag/AgCl as the reference electrode (RE), and a cleaned glass carbon electrode as the counter electrode (CE).

Initial parameter setup for DPV detection: Start and end potentials vs. reference electrode are −0.4V and 0.45 V, respectively, with an amplitude of 0.1 V, a potential increment of V, a pulse width of 0.1 s, a quiet time of 60 s, a sample width of 0.0167 s and a pulse period of 0.5 s.

Steps of stabilization:

(a) Primary Stabilization: Soak the three-electrode article in 10 ml synthetic solution for minutes, followed by 2-times 10 ml DI water rinsing; Rinse the three-electrode article by 10 ml FCA PBS solution and soak in new 10 ml FCA PBS solution for 5 minutes; and obtain the stabilized DPV signal by adjusting the parameter of quiet time. If DPV peak current increase or decrease more than 0.04 μA, then reduce or enhance the quiet time by 5 s. If change of peak current is less than 0.04 μA, but larger than 0.01 μA, then change the quiet time by 2-3 s. If change among three repeated measurements stay within 0.01 μA, the DPV signal is considered as "primarily stable."

(b) Secondary Stabilization: Rinse the three-electrode article twice with 10 ml DI water; Soak the three-electrode article in 10 ml synthetic solution for 10 minutes, followed by 2-times ml DI water rinsing; Rinse the three-electrode article by 10 ml FCA PBS solution and soak in new 10 ml FCA PBS solution for 5 minutes; and conduct repetitive run of DPV measurement until peak current of 5 successive readings fluctuates less than 0.01 μA.

Following 2-times 10 ml DI water rinsing, the three-electrode article was treated by soaking in 10 ml of sample solution for 20 minutes, 2-times 10 ml DI water rinsing, and 1-time ml FCA PBS solution rinsing, sequentially.

Following 5 minutes soaking in new 10 ml FCA solution, the same number of DPV measurement was conducted as in the secondary stabilization.

Data analysis was recorded in Table 1 and below: Obtain the average reading (Io) of the last five measurements during secondary stabilization; Obtain the average reading (Is) of the last five measurements for sample solution; and calculate the relative change ΔR (%) using the following equation: ΔR (%)=(Is−Io)/Io*100%.

TABLE 1

Data analysis of 1 ppb PFOA sample testing

| | Io (μA) | Is (μA) | ΔR (%) |
|---|---|---|---|
| 1 | 5.2611 | 5.1104 | −2.86 |
| 2 | 5.2588 | 5.11075 | −2.82 |
| 3 | 5.25035 | 5.1105 | −2.66 |
| 4 | 5.2587 | 5.10635 | −2.90 |
| 5 | 5.2574 | 5.11915 | −2.63 |
| Average | 5.25727 | 5.11143 | −2.77 |
| Std | 0.004091393 | 0.004684896 | |

Figure 17:
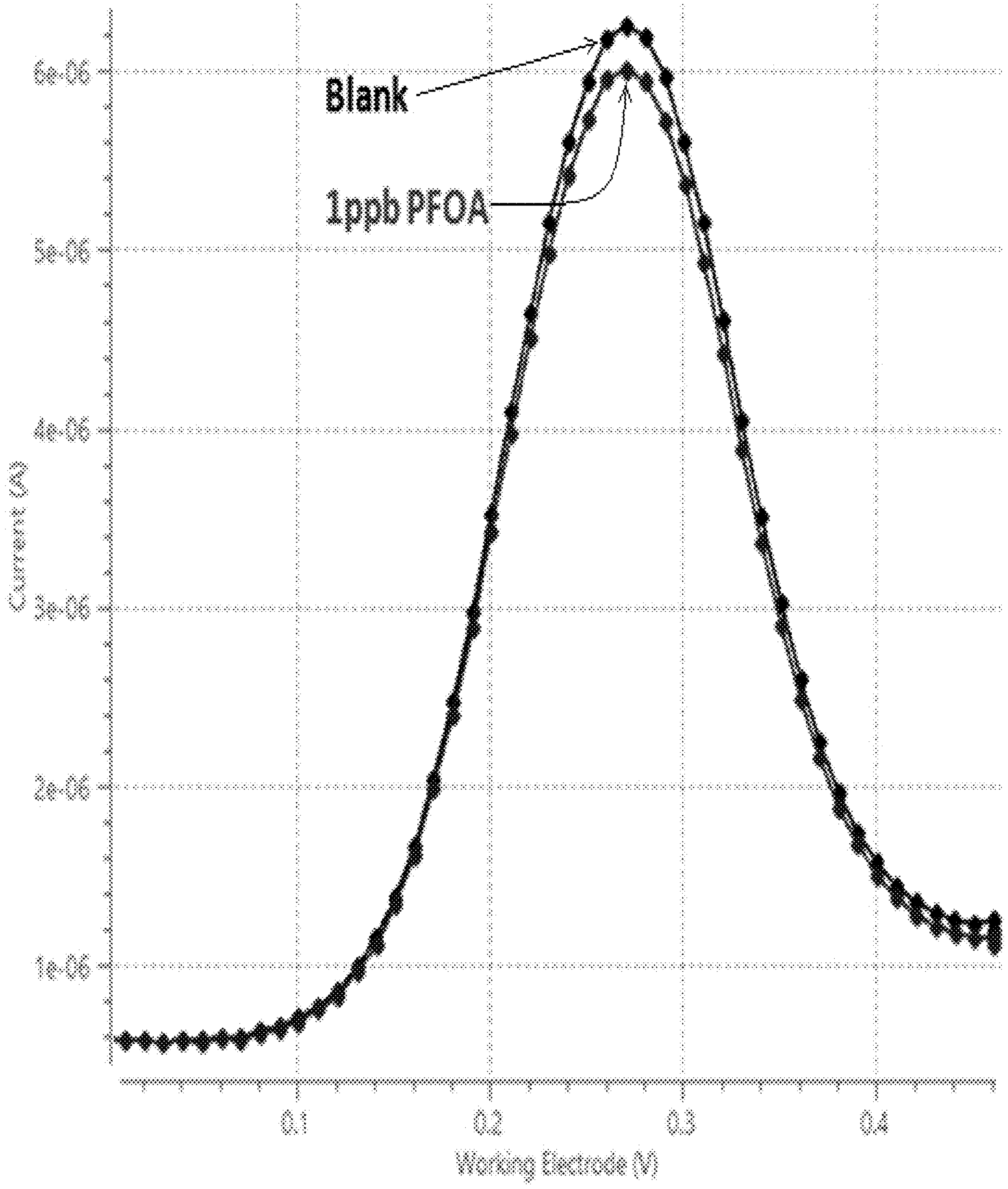
FIG. 17 shows the DPV curves of PFOA-imprinted MIP sensor after exposure to synthetic solution and PFOA sample solution respectively, in accordance with exemplary embodiments of the present invention.

FIG. 17 shows the DPV curves of PFOA-imprinted MIP sensor in 0.5 mM FCA PBS solution after exposure to synthetic solution and 1 ppb PFOA sample solution, respectively.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A method of determining a concentration of an analyte in a sample solution, comprising:

(A1) forming an initial layer embedded with molecules of the analyte on a conductive surface of a glassy carbon sensor, wherein the step (A1) comprises electrochemical polymerization of a mixture containing monomers and the analyte, wherein the analyte does not participate in the electrochemical polymerization but is imprinted into the polymerization product; and wherein the step (A1) comprises depositing per- and polyfluoroalkyl substance (PFAS)-imprinted polymer layer on the conductive surface of the glassy carbon sensor by cyclic voltammetry in precursor solution containing the monomers of 4-(trifluoromethyl)benzene-1,2-diamine and 4-vinylaniline, and PFAS as the analyte in deionized (DI) water and using a ramping voltage for the electrochemical polymerization;

(A2) conducting a crosslinking reaction on the product from the step (A1), wherein the crosslinking reaction is conducted in heptane containing azobisisobutyronitrile (AIBN), and wherein the crosslinking reaction is initiated by UV irradiation on vinyl groups in the product from the step (A1); and terminated with a radical inhibitor 1,4-benzoquinone in heptane;

(A3) removing said molecules of the analyte from the initial layer from the step (A2), and leaving cavities or holes behind, the step (A3) comprises removing the imprinted PFAS molecules with pure methanol solvent, followed by thorough DI water treatment to eliminate the methanol solvent;

wherein a sensing electrode is prepared from the steps (A1), (A2) and (A3), wherein the sensing electrode includes the glassy carbon sensor having the conductive surface, and the initial layer formed on said conductive surface; wherein the sensing electrode is configured for detecting the analyte, wherein the initial layer has the cavities or the holes, each of which can be filled with, bound to, or occupied by, the molecule of the analyte, and wherein a decrease of conductivity of the sensing electrode is correlated to an amount of the cavities or the holes that are filled with, bound to, or occupied by, the molecules of the analyte;

(B) preparing an electrochemical sensing system configured for differential pulse voltammetry (DPV); wherein the electrochemical sensing system comprises (i) a working electrode which is the sensing electrode prepared from the steps (A1), (A2) and (A3), (ii) a reference electrode, and (iii) a counter electrode;

(C1) providing a DPV setting with a mediator which is ferrocyne carboxyl acid (FCA) in phosphate buffered saline (PBS) buffer solution, (C2) inserting the electrochemical sensing system into the mediator, (C3) acquiring stable DPV signals through tuning scanning parameters comprising starting potential and quiet time, (C4) using a peak current of stabilized DPV curves as a baseline for detecting the analyte, (C5) incubating the electrochemical sensing system in the sample solution for a period of time, (C6) taking the electrochemical sensing system out of the sample solution and thoroughly rinsing the electrochemical sensing system with the mediator, (C7) inserting the incubated electrochemical sensing system into the mediator and measuring DPV curve of the sample solution, and (C8) correlating peak current reduction to the analyte's concentration in the sample solution.

2. The method according to claim 1, wherein the sensing electrode is selected from paired interdigital electrodes, integrated circular electrodes, and discrete electrodes.

3. The method according to claim 1, wherein the step (A1) comprises simultaneously forming the initial layers on the conductive surfaces of two or more of said glassy carbon sensors in a batch to form two or more of said sensing electrodes prepared from be steps (A1), (A2) and (A3).

4. The method according to claim 3, wherein said two or more of said sensing electrodes are used as two or more working electrodes placed in an electrochemical polymerization system with the reference electrode and the counter electrode;

wherein said two or more working electrodes and the counter electrode are bundled together, and wherein the distance between said each of said two or more working electrodes and the counter electrode are the same; and wherein the step (A1) comprises electrochemically polymerizing the monomers and the analyte in a container onto the two or more of said glassy carbon sensors in the same container, wherein the analyte does not participate in the electrochemical polymerization but is imprinted into the polymerization product.

5. The method according to claim 1, wherein the product of the electrochemical polymerization comprises a random polymer rather than a block polymer.

6. The method according to claim 1, wherein the mediator is 2 mM FCA in the PBS buffer solution with a pH of 7.4 and the step (C5) is incubating the electrochemical sensing system in the sample solution for a period of 5-20 minutes.

* * * * *